(12) United States Patent
Zhang et al.

(10) Patent No.: US 11,968,422 B2
(45) Date of Patent: Apr. 23, 2024

(54) VIDEO STREAM FAULT DETECTION

(71) Applicant: Huawei Technologies Co., Ltd., Shenzhen (CN)

(72) Inventors: Yanfang Zhang, Nanjing (CN); Jian Cheng, Nanjing (CN); Yan Bai, Beijing (CN); Liang Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 539 days.

(21) Appl. No.: 16/695,652

(22) Filed: Nov. 26, 2019

(65) Prior Publication Data

US 2020/0099981 A1 Mar. 26, 2020

Related U.S. Application Data

(63) Continuation of application No. PCT/CN2018/074797, filed on Jan. 31, 2018.

(30) Foreign Application Priority Data

May 27, 2017 (CN) .......................... 201710396274.0

(51) Int. Cl.
*H04N 21/234* (2011.01)
*H04L 1/00* (2006.01)
(Continued)

(52) U.S. Cl.
CPC ..... *H04N 21/44209* (2013.01); *H04L 1/0045* (2013.01); *H04L 1/08* (2013.01);
(Continued)

(58) Field of Classification Search
None
See application file for complete search history.

(56) References Cited

U.S. PATENT DOCUMENTS 6,421,387 B1 7/2002 Rhee
7,821,937 B1 * 10/2010 Guo .................... H04L 43/0829
370/230.1
(Continued)

FOREIGN PATENT DOCUMENTS

CN 101304343 A 11/2008
CN 101572829 A 11/2009
(Continued)

OTHER PUBLICATIONS

Hang, J., "The Research and Application of Real-Time Packet Video Quality Based on the Condition of the Net," May 2008, 89 pages.
(Continued)

*Primary Examiner* — Brian T Pendleton
*Assistant Examiner* — Jean D Saint Cyr
(74) *Attorney, Agent, or Firm* — Conley Rose. P.C.

(57) ABSTRACT

A fault detection method includes: obtaining a video quality parameter of a monitored video stream, where the video quality parameter is determined according to a packet loss recovery method of the monitored video stream, the video quality parameter includes an effective packet loss factor, and the effective packet loss factor is used to indicate effectiveness of network packet loss recovery performed by using the packet loss recovery method of the monitored video stream; and performing fault detection based on the video quality parameter of the monitored video stream.

20 Claims, 13 Drawing Sheets

(51) Int. Cl.
*H04L 1/08* (2006.01)
*H04L 43/0829* (2022.01)
*H04N 21/2343* (2011.01)
*H04N 21/236* (2011.01)
*H04N 21/2365* (2011.01)
*H04N 21/238* (2011.01)
*H04N 21/24* (2011.01)
*H04N 21/434* (2011.01)
*H04N 21/438* (2011.01)
*H04N 21/44* (2011.01)
*H04N 21/442* (2011.01)
*H04N 21/4425* (2011.01)
*H04N 21/6375* (2011.01)
*H04N 21/643* (2011.01)
*H04N 21/647* (2011.01)

(52) U.S. Cl.
CPC ......... *H04L 43/0829* (2013.01); *H04N 21/44* (2013.01); *H04N 21/64322* (2013.01)

(56) References Cited

U.S. PATENT DOCUMENTS

| | | |
|---|---|---|
| 2008/0109865 A1 | 5/2008 | Su et al. |
| 2009/0106809 A1 | 4/2009 | Rahman |
| 2011/0271307 A1 | 11/2011 | Post et al. |
| 2012/0039194 A1* | 2/2012 | Kure ............... H04N 19/124 375/259 |
| 2012/0278845 A1 | 11/2012 | Ou |
| 2012/0287986 A1* | 11/2012 | Paniconi ............ H04N 19/174 375/E7.126 |
| 2013/0279347 A1 | 10/2013 | Liu et al. |
| 2013/0314553 A1* | 11/2013 | Sun ............... H04N 21/44008 348/192 |
| 2014/0313877 A1 | 10/2014 | Gao |
| 2014/0359389 A1 | 12/2014 | Seastrom et al. |
| 2015/0341812 A1 | 11/2015 | Dion et al. |
| 2016/0037229 A1 | 2/2016 | Rahman |
| 2016/0316402 A1 | 10/2016 | Shi et al. |
| 2017/0237637 A1 | 8/2017 | Cai et al. |
| 2019/0082339 A1* | 3/2019 | Dion ............... H04N 21/64738 |
| 2019/0288905 A1 | 9/2019 | Wang et al. |

FOREIGN PATENT DOCUMENTS

| | | |
|---|---|---|
| CN | 102065372 A | 5/2011 |
| CN | 102118653 A | 7/2011 |
| CN | 102130821 A | 7/2011 |
| CN | 102546263 A | 7/2012 |
| CN | 102572531 A | 7/2012 |
| CN | 102769551 A | 11/2012 |
| CN | 103179597 A | 6/2013 |
| CN | 103237314 A | 8/2013 |
| CN | 103338471 A | 10/2013 |
| CN | 103686445 A | 3/2014 |
| CN | 103686446 A | 3/2014 |
| CN | 103813160 A | 5/2014 |
| CN | 103945213 A | 7/2014 |
| CN | 103957222 A | 7/2014 |
| CN | 104052622 A | 9/2014 |
| CN | 104159166 A | 11/2014 |
| CN | 104539941 A | 4/2015 |
| CN | 104885523 A | 9/2015 |
| CN | 106330930 A | 1/2017 |
| CN | 106452925 A | 2/2017 |
| CN | 106549916 A | 3/2017 |
| EP | 2690882 A1 | 1/2014 |
| EP | 2521298 B1 | 8/2014 |
| JP | 2010161649 A | 7/2010 |
| JP | 2011010237 A | 1/2011 |
| JP | 2016146571 A | 8/2016 |
| WO | 2016090632 A1 | 6/2016 |

OTHER PUBLICATIONS

Zare, S., "An FEC scheme combined with weighted scheduling to reduce multicast packet loss in IPTV over PON," Journal of Network and Computer Applications, vol. 35, Jan. 2012, pp. 459-468.

* cited by examiner

VIDEO STREAM FAULT DETECTION

CROSS-REFERENCE TO RELATED APPLICATIONS

This is a continuation of Int'l Patent App. No. PCT/CN2018/074797 filed on Jan. 31, 2018, which claims priority to Chinese Patent App. No. 201710396274.0 filed on May 27, 2017, which are incorporated by reference.

TECHNICAL FIELD

Embodiments of the present disclosure relate to the field of multimedia technologies, and in particular, to a fault detection method, a monitoring device, and a network device.

BACKGROUND

In an Internet Protocol television (IPTV) video service, a video head end delivers a video stream; a network device transmits the video stream to a set-top box (STB) deployed on a user side; and the STB transmits the video stream to a display device for displaying. A packet loss and a delay that occur in a network transmission process have different impact on the video service. Usually, a packet loss rate may be used to represent impact of network transmission quality on video quality. In addition, in some approaches, network transmission quality is monitored by using the packet loss rate. When a video service fault occurs (for example, erratic display occurs during playback), once it is determined that the packet loss rate is higher than a threshold, it indicates that a network transmission status is poor, and the video service fault is caused by network transmission.

To improve service quality in an IPTV system, a network operator usually uses various packet loss recovery methods, for example, technologies such as forward error correction (FEC) and retransmission (RET), to enhance a fault tolerance capability of the IPTV system for a network packet loss. Using a packet loss recovery method may affect sensitivity of the user side to the packet loss rate. In a scenario using the packet loss recovery method, if the packet loss rate is still used for fault detection, a detection result is inaccurate.

SUMMARY

This disclosure provides a fault detection method, a monitoring device, and a network device to accurately perform fault detection on a video service.

To achieve the foregoing objectives, the following technical solutions are used in this disclosure.

According to a first aspect, a fault detection method is provided and includes: obtaining a video quality parameter of a monitored video stream, where in a specific implementation, the video quality parameter is determined according to a packet loss recovery method of the monitored video stream, the video quality parameter may include an effective packet loss factor, and the effective packet loss factor is used to indicate effectiveness of network packet loss recovery performed by using the packet loss recovery method of the monitored video stream; and finally, performing fault detection based on the video quality parameter of the monitored video stream.

Obviously, in the fault detection method provided by this embodiment of the present disclosure, the video quality parameter that needs to be monitored is determined according to the packet loss recovery method of the monitored video stream. The parameter may include the effective packet loss factor, and the effective packet loss factor can indicate effectiveness of network packet loss recovery performed by using the packet loss recovery method. Because compensation of the packet loss recovery method for a packet loss in network transmission is considered, fault detection can be accurately performed on a video service based on the video quality parameter of the monitored video stream. For example, although a network status is poor, and a packet loss rate is relatively high, the effective packet loss factor is relatively low, that is, a lost source packet is recovered effectively by using the packet loss recovery method. Therefore, a video service fault that occurs in this case is not caused by a network fault, but may be caused by a fault of a head end device or a fault of a user terminal. Obviously, the method provided by this embodiment of the present disclosure improves accuracy of fault detection on the video service.

With reference to the first aspect, in a first possible implementation of the first aspect, before the obtaining a video quality parameter of a monitored video stream, the method further includes: sending a video quality parameter request message to at least one network device that the monitored video stream flows through, where the video quality parameter request message is used to indicate an identifier of the monitored video stream and the packet loss recovery method of the monitored video stream; for example, if the monitored video stream is a live video stream, the identifier of the monitored video stream may be a channel number or a multicast address and a port number; or if the monitored video stream is an on-demand video stream, the identifier of the monitored video stream may be a quintuple; and the obtaining a video quality parameter of a monitored video stream specifically includes: obtaining the video quality parameter of the monitored video stream from the at least one network device.

Therefore, a monitoring device can obtain the video quality parameter that is of the monitored video stream and is reported by the at least one network device that the monitored video stream flows through.

With reference to the first aspect or any possible implementation of the first aspect, in a second possible implementation of the first aspect, the effective packet loss factor may indicate effectiveness of network packet loss recovery performed by using the packet loss recovery method of the monitored video stream, for example, effectiveness of network packet loss recovery performed by using the packet loss recovery method of the monitored video stream, or a probability of effectively performing network packet loss recovery by using the packet loss recovery method of the monitored video stream.

Specifically, if no packet loss recovery method is set for the monitored video stream, the video quality parameter includes the following parameter: a packet loss rate; if the packet loss recovery method of the monitored video stream is FEC, the video quality parameter includes the following parameters: a packet loss rate and a first effective packet loss factor (that is, the foregoing effective packet loss factor in the first aspect), where the first effective packet loss factor is used to indicate effectiveness of network packet loss recovery performed by using FEC; if both RET and FEC are set for the monitored video stream, the video quality parameter includes the following parameters: a packet loss rate, a maximum consecutive packet loss quantity, and a second effective packet loss factor (that is, the foregoing effective packet loss factor in the first aspect), where the second effective packet loss factor is used to indicate effectiveness of network packet loss recovery performed by using RET and FEC; or if the packet loss recovery method of the monitored video stream is retransmission RET, the video quality parameter includes the following parameters: a packet loss rate, a maximum consecutive packet loss quantity, and a third effective packet loss factor, where the third effective packet loss factor is used to indicate effectiveness of network packet loss recovery performed by using RET.

Obviously, according to the packet loss recovery method such as FEC or RET that is set for the monitored video stream, different video quality parameters are collected. In a scenario in which different packet loss recovery methods are used, when the packet loss rate is considered, compensation of the packet loss recovery method for the network packet loss may be considered. For example, the first effective packet loss factor indicates effectiveness of network packet loss recovery performed by using FEC. Specifically, if the video quality parameter includes the packet loss rate and the first effective packet loss factor, when the first effective packet loss factor is greater than a corresponding threshold, it is determined that an effect of compensation for the network packet loss by using the FEC is not significant. In this case, it may be determined that a video service fault is caused by a network transmission fault.

With reference to the first aspect and any possible implementation of the first aspect, in a third possible implementation of the first aspect, the first effective packet loss factor ELF_F satisfies:

$$\text{ELF\_F} = \frac{1}{L}\sum_{l}\frac{1}{K}\sum_{k}x_l(k),$$

where $$x_l(k) = \begin{cases} 1 & Num_l(k) > R \\ 0 & Num_l(k) \leq R \end{cases}$$

and $0<l\leq L$, $0<k\leq K$; L is a source block length that is set when FEC is used for packet loss recovery; for any l greater than 0 and less than or equal to L, $$\frac{1}{K}\sum_{k}x_l(k)$$

is an average value obtained after summation of $x_l(1)$ to $x_l(K)$, K is a quantity of monitoring windows, the monitoring windows include first $\lfloor N/L \rfloor$ windows obtained by dividing N source packets based on the source block length by using an $l^{th}$ source packet in a monitoring period as a start point, and the N source packets herein are all source packets that are included from the $l^{th}$ source packet in the monitoring period to a last source packet in the monitoring period; and $Num_l(k)$ is a quantity of lost packets in a $k^{th}$ window in the K monitoring windows, and R is a maximum quantity of lost packets that can be recovered for L source packets by using FEC.

With reference to the first aspect and any possible implementation of the first aspect, in a fourth possible implementation of the first aspect, the second effective packet loss factor ELF_FR satisfies:

$$\text{ELF\_FR} = \frac{1}{L}\sum_{l}y(l),$$

where $$y(l) = \begin{cases} 1 & x(l) > \delta \\ 0 & x(l) \leq \delta \end{cases}, x(l) = \sum_{k}\text{lost}(k),$$

and $0<l\leq L$, $0<k\leq K$; L is a source block length that is set when FEC is used for packet loss recovery; for any l greater than 0 and less than or equal to L, K is a quantity of corresponding monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and lost(k) is a quantity of source packets that cannot be recovered in a $k^{th}$ window in the K monitoring windows by using FEC, $\delta$ is a maximum quantity of lost packets that can be recovered for E source packets by using RET, and E is a quantity of source packets in one monitoring period; or the second effective packet loss factor ELF_FR satisfies:

$$\text{ELF\_FR} = \frac{1}{L}\sum_{l}\frac{1}{K}\sum_{k}y_l(k),$$

where $$y_l(k) = \begin{cases} 1 & x'_l(k) > R \\ 0 & x'_l(k) \leq R \end{cases}, x'_l(k) = \begin{cases} x_l(k) - E' & x_l(k) \geq E' \\ 0 & x_l(k) < E' \end{cases},$$

and $0<l\leq L$, $0<k\leq K$; L is a source block length that is set when FEC is used for packet loss recovery; for any l greater than 0 and less than or equal to L, $$\frac{1}{K}\sum_{k}y_l(k)$$

is an average value obtained after summation of $y_l(1)$ to $y_l(K)$, K is a quantity of monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and $x_l(k)$ is a quantity of lost packets in a $k^{th}$ window in the K monitoring windows, E' is a quantity of source packets that can be recovered in the $k^{th}$ window by using FEC, and R is a maximum quantity of lost packets that can be recovered for L source packets by using RET.

With reference to the first aspect and any possible implementation of the first aspect, in a fifth possible implementation of the first aspect, the third effective packet loss factor ELF_R satisfies:

$$\text{ELF\_R} = \frac{1}{K} \sum_l \frac{1}{K} \sum_k x_l(k),$$

where $$x_l(k) = \begin{cases} 1 & Num_l(k) > R \\ 0 & Num_l(k) \leq R \end{cases}$$

and $0<l\leq L$, $0<k\leq K$; L is a preset window length; for any l greater than 0 and less than or equal to L, $$\frac{1}{K} \sum_k x_l(k)$$

is an average value obtained after summation of $x_l(1)$ to $x_l(K)$, K is a quantity of monitoring windows, the monitoring windows include first $\lfloor N/L \rfloor$ windows obtained by dividing N source packets based on the preset window length by using an $l^{th}$ source packet in a monitoring period as a start point, and the N source packets are all source packets that are included from the $l^{th}$ source packet in the monitoring period to a last source packet in the monitoring period; and $Num_l(k)$ is a quantity of lost packets in a $k^{th}$ window in the K monitoring windows, and R is a maximum quantity of lost packets that can be recovered for L source packets by using RET.

With reference to the first aspect and any possible implementation of the first aspect, in a sixth possible implementation of the first aspect, the at least one network device includes a first device; and the performing fault detection based on the video quality parameter of the monitored video stream specifically includes: if a first video quality parameter reported by the first device is received in a monitoring period, determining that a fault occurs between the first device and a head end device, where the head end device is a device that provides the monitored video stream, and the first video quality parameter is reported to the monitoring device after the first device determines that at least one of the first video quality parameters exceeds a corresponding threshold.

Herein each device first collects a corresponding video quality parameter according to the packet loss recovery method of the monitored video stream, and once determining that the video quality parameter exceeds a corresponding threshold, reports the video quality parameter to the monitoring device. Obviously, in a monitoring period, if the monitoring device receives a video quality parameter reported by a network device, it indicates that the video quality parameter reported by the network device exceeds a threshold, that is, a fault occurs upstream of the network device, and it may be considered that a fault occurs between the network device and the head end device. Otherwise, if the monitoring device does not receive the video quality parameter reported by the network device, it indicates that the video quality parameter collected by the network device does not exceed the threshold. Therefore, reporting is performed only when a video quality parameter exceeds a threshold. This can reduce a quantity of pieces of signaling received by the monitoring device, and reduce processing load of the monitoring device.

With reference to the first aspect and any possible implementation of the first aspect, in a seventh possible implementation of the first aspect, the at least one network device further includes a second device downstream of the first device; and the method further includes: if the monitoring device receives a second video quality parameter reported by the second device but does not receive the first video quality parameter in the monitoring period, determining that a fault occurs between the first device and the first device, where the second video quality parameter is reported to the monitoring device after the second device determines that at least one of the second video quality parameters exceeds a corresponding threshold; or if the monitoring device does not receive the second video quality parameter and the first video quality parameter in the monitoring period, determining that a fault occurs between the second device and a user terminal, where the user terminal is a device that receives the monitored video stream.

When no video quality parameter reported by the first device is received in the monitoring period, it indicates that none of video quality parameters monitored by the first device exceeds a corresponding threshold, that is, no fault occurs upstream of the first device. In addition, if the video quality parameter reported by the second device is received, it indicates that a fault occurs upstream of the second device. Therefore, it can be concluded that a fault occurs between the first device and the second device. Likewise, if the video quality parameters reported by the first device and the second device are not received in the monitoring period, it indicates that no fault occurs upstream of the second device. In this case, a video service fault is caused by a fault between the user terminal and the second device.

With reference to the first aspect and any possible implementation of the first aspect, in an eighth possible implementation of the first aspect, the at least one network device includes N network devices that the monitored video stream flows through, and N is an integer greater than or equal to 2; and the obtaining, by the monitoring device, the video quality parameter that is of the monitored video stream and is monitored by the at least one network device specifically includes: receiving a video quality parameter that is of the monitored video stream and is sent by each of the N network devices.

In this scenario, each of the N network devices that the monitored video stream flows through collects a corresponding video quality parameter according to a packet loss recovery method set by the network device, and reports the collected video quality parameter to the monitoring device after collecting the video quality parameter.

With reference to the first aspect and any possible implementation of the first aspect, in a ninth possible implementation of the first aspect, if determining that at least one of first video quality parameters reported by a first device among the N network devices is greater than or equal to a corresponding threshold, determining that a fault occurs between the first device and the second device, where the head end device is a device that provides the monitored video stream; or if determining that first video quality parameters reported by the first device are all less than corresponding thresholds and that at least one of second video quality parameters reported by a second device downstream of the first device among the N network devices is greater than or equal to a corresponding threshold, determining that a network fault occurs between the first device and the second device.

In other words, when at least one of video quality parameters reported by a device exceeds a corresponding threshold, it may indicate that a fault occurs upstream of the network device. For example, if a video quality parameter reported by a most downstream device among the N network devices exceeds a threshold, it may be considered that a video service fault is caused by a network transmission fault; or if a video quality parameter reported by a most upstream device that the monitored video stream flows through exceeds a corresponding threshold, it may be considered that a video service fault is caused by a fault of the head end device.

With reference to the first aspect and any possible implementation of the first aspect, in a tenth possible implementation of the first aspect, if the monitoring device determines that the network fault occurs between the first device and the second device, the method further includes: determining a fault probability of each of M+1 network segments, where the network segment is a network between any two neighboring devices among the first device, M third devices, and the second device, and the third device is a device between the first device and the second device; and determining a network segment with a highest fault probability among the M+1 network segments as a faulty network segment, where M is an integer less than N.

Obviously, in the method provided by this embodiment of the present disclosure, fault detection may be further performed on a specific network segment, and therefore accuracy of fault detection on the video service is improved.

With reference to the first aspect and any possible implementation of the first aspect, in an eleventh possible implementation of the first aspect, the determining a fault probability of each of M+1 network segments specifically includes: calculating a fault probability $p_i^Q$ that a fault caused by a $Q^{th}$ parameter in the video quality parameters occurs in an $i^{th}$ network segment, where i is an integer greater than or equal to 1 and less than or equal to M+1, and $p_i^Q$ satisfies:

$$p_i^Q = \begin{cases} \delta_i^Q / \sum_i \delta_i^Q, & \sum_i \delta_i^Q > \lambda_Q \\ 0, & \sum_i \delta_i^Q \leq \lambda_Q \end{cases},$$

where $\delta_i^Q = \theta_{i+1}^Q - \theta_i^Q$, $\theta_{i+1}^Q$ is a $Q^{th}$ parameter reported by an $(i+1)^{th}$ device, $\theta_i^Q$ is a $Q^{th}$ parameter reported by an $i^{th}$ device, $\lambda_Q$ is a threshold corresponding to the $Q^{th}$ parameter, and the $(i+1)^{th}$ device is an upstream device neighboring to the $i^{th}$ device; and determining a fault probability of a parameter whose fault probability is highest in all parameters included in the video quality parameters as a fault probability $p_i$ of the $i^{th}$ network segment.

In a specific implementation, a fault probability of each network segment may be calculated based on a video quality parameter reported by each network device that the monitored video stream flows through; and further, fault detection is performed on a network segment with a highest fault probability, and therefore accuracy of fault detection on the video service is improved.

With reference to the first aspect and any possible implementation of the first aspect, in a twelfth possible implementation of the first aspect, the method further includes: calculating a fault probability $p'_i$ of the $i^{th}$ network segment in T consecutive monitoring periods, where T is an integer greater than or equal to 2, and $p'_i$ satisfies:

$$p'_i = \sum_t \beta_t p_i(t),$$

where $\beta_t = 2^{-t}$ and $t \in [1, \ldots, T]$; and updating the fault probability of the $i^{th}$ network segment to S, where $$S = p'_i \bigg/ \sum_i p'_i.$$

Updating a fault probability of a network segment to an average fault probability of the network segment in a plurality of consecutive monitoring periods can improve accuracy of fault locating. If an average fault probability of a network segment in a plurality of consecutive monitoring periods is higher than a threshold, it indicates that the fault probability of the network segment is very high, and that a video service fault is probably caused by a fault of the network segment.

With reference to the first aspect and any possible implementation of the first aspect, in a thirteenth possible implementation of the first aspect, when l is greater than 1, the monitoring windows further include a first window, where the first window is a window constituted by source packets before the $l^{th}$ source packet; and/or when N/L is not an integer, the monitoring windows further include a second window, where the second window is a last window in the windows obtained through window division by using the $l^{th}$ source packet in the monitoring period as the start point.

With reference to the first aspect and any possible implementation of the first aspect, in a fourteenth possible implementation of the first aspect, when a quantity of source packets in the first window is greater than a first threshold, the monitoring windows further include the first window.

In other words, the monitoring windows further include the first window and the first window is used as a monitoring window only when l is greater than 1 and the quantity of source packets in the first window is greater than the first threshold.

With reference to the first aspect and any possible implementation of the first aspect, in a fifteenth possible implementation of the first aspect, when a quantity of source packets in the second window is greater than a second threshold, the monitoring windows further include the second window.

In other words, the monitoring windows further include the second window and the second window is used as a monitoring window only when N/L is not an integer and the quantity of source packets in the second window is greater than the second threshold.

According to a second aspect, a fault detection method is disclosed and includes: determining a video quality parameter of a monitored video stream according to a packet loss recovery method of the monitored video stream, where the video quality parameter includes an effective packet loss factor, and the effective packet loss factor is used to indicate effectiveness of network packet loss recovery performed by using the packet loss recovery method of the monitored video stream; and sending the video quality parameter of the monitored video stream to a monitoring device.

The method provided in the second aspect may be performed by a network device that the monitored video stream flows through. Obviously, in the fault detection method provided by this embodiment of the present disclosure, the network device may determine, according to the packet loss recovery method set for the monitored video stream, the video quality parameter that needs to be monitored. The parameter may include the effective packet loss factor, and the effective packet loss factor can indicate effectiveness of network packet loss recovery performed by using the packet loss recovery method. Because compensation of the packet loss recovery method for a packet loss in network transmission is considered, fault detection can be accurately performed on a video service based on the video quality parameter of the monitored video stream. For example, although a network status is poor, and a packet loss rate is relatively high, the effective packet loss factor is relatively low, that is, a lost source packet is recovered effectively by using the packet loss recovery method. Therefore, a video service fault that occurs in this case is not caused by a network fault, but may be caused by a fault of a head end device or a fault of a user terminal. In conclusion, the method provided by this embodiment of the present disclosure improves accuracy of fault detection on the video service.

With reference to the second aspect, in a first possible implementation of the second aspect, before the determining a video quality parameter of a monitored video stream according to a packet loss recovery method of the monitored video stream, the method further includes: receiving a video quality parameter request message sent by the monitoring device, where the video quality parameter request message is used to indicate an identifier of the monitored video stream and the packet loss recovery method of the monitored video stream.

With reference to the second aspect, in a second possible implementation of the second aspect, the determining a video quality parameter of a monitored video stream according to a packet loss recovery method of the monitored video stream specifically includes: if no packet loss recovery method is set for the monitored video stream, and the video quality parameter includes a packet loss rate, determining the packet loss rate, where the packet loss rate is a ratio of a quantity of lost packets to a quantity of source packets expected to be received; if the packet loss recovery method of the monitored video stream is forward error correction FEC, and the video quality parameter includes a packet loss rate and a first effective packet loss factor, determining the packet loss rate and the first effective packet loss factor (that is, the foregoing effective packet loss factor in the second aspect); if both RET and FEC are set for the monitored video stream, determining that the video quality parameter includes a packet loss rate, a maximum consecutive packet loss quantity, and a second effective packet loss factor (that is, the foregoing effective packet loss factor in the second aspect), and determining the packet loss rate, the maximum consecutive packet loss quantity, and the second effective packet loss factor; or if the packet loss recovery method of the monitored video stream is RET, and the video quality parameter includes a packet loss rate, a maximum consecutive packet loss quantity, and a third effective packet loss factor, determining the packet loss rate, the maximum consecutive packet loss quantity, and the third effective packet loss factor.

Obviously, according to the packet loss recovery method such as FEC or RET that is set for the monitored video stream, different video quality parameters are collected. In a scenario in which different packet loss recovery methods are used, when the packet loss rate is considered, compensation of the packet loss recovery method for the network packet loss may be considered. For example, the first effective packet loss factor indicates effectiveness of network packet loss recovery performed by using FEC. Specifically, if the video quality parameter includes the packet loss rate and the first effective packet loss factor, when the packet loss rate is greater than a corresponding threshold and the first effective packet loss factor is greater than a corresponding threshold, it is determined that an effect of compensation for the network packet loss by using the FEC is not significant. In this case, it may be determined that a video service fault is caused by a network transmission fault when the packet loss rate is greater than the corresponding threshold.

With reference to the second aspect and any possible implementation of the second aspect, in a third possible implementation of the second aspect, the first effective packet loss factor ELF_F satisfies:

$$\mathrm{ELF\_R} = \frac{1}{K}\sum_{l}\frac{1}{K}\sum_{k}x_l(k),$$

where $$x_l(k) = \begin{cases} 1 & Num_l(k) > R \\ 0 & Num_l(k) \le R \end{cases}$$

and $0 < l \le L$, $0 < k \le K$; L is a source block length that is set when FEC is used for packet loss recovery; for any l greater than 0 and less than or equal to L, $$\frac{1}{K}\sum_{k}x_l(k)$$

is an average value obtained after summation of $x_l(1)$ to $x_l(K)$, K is a quantity of monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and $Num_l(k)$ is a quantity of lost packets in a $k^{th}$ window in the K monitoring windows, and R is a quantity of redundant packets of a single source block that is set when FEC is used for packet loss recovery.

With reference to the second aspect and any possible implementation of the second aspect, in a fourth possible implementation of the second aspect, the second effective packet loss factor ELF_FR satisfies:

$$\mathrm{ELF\_FR} = \frac{1}{L}\sum_{l}y(l),$$

where $$y(l) = \begin{cases} 1 & x(l) > \delta \\ 0 & x(l) \le \delta \end{cases}, x(l) = \sum_{k}\mathrm{lost}(k),$$

and $0<l\le L$, $0<k\le K$; L is a source block length that is set when FEC is used for packet loss recovery; for any l greater than 0 and less than or equal to L, K is a quantity of corresponding monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and lost(k) is a quantity of source packets that cannot be recovered in a $k^{th}$ window in the K monitoring windows by using FEC, $\delta$ is a maximum quantity of lost packets that can be recovered for E source packets by using RET, and E is a quantity of source packets in one monitoring period; or the second effective packet loss factor ELF_FR satisfies:

$$\text{ELF\_FR} = \frac{1}{L}\sum_{l}\frac{1}{K}\sum_{k}y_l(k),$$

where $$y_l(k) = \begin{cases} 1 & x'_l(k) > R \\ 0 & x'_l(k) \le R \end{cases}, \quad x'_l(k) = \begin{cases} x_l(k) - E' & x_l(k) \ge E' \\ 0 & x_l(k) < E' \end{cases},$$

and $0<l\le L$, $0<k\le K$; L is a source block length that is set when FEC is used for packet loss recovery; for any l greater than 0 and less than or equal to $$\frac{1}{K}\sum_{k}y_l(k)$$

is an average value obtained after summation of $y_l(1)$ to $y_l(K)$, K is a quantity of monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and $x_l(k)$ is a quantity of lost packets in a $k^{th}$ window in the K monitoring windows, E' is a quantity of source packets that can be recovered in the $k^{th}$ window by using FEC, and R is a maximum quantity of lost packets that can be recovered for L source packets by using RET.

With reference to the second aspect and any possible implementation of the second aspect, in a fifth possible implementation of the second aspect, the third effective packet loss factor ELF_R satisfies:

$$\text{ELF\_R} = \frac{1}{L}\sum_{l}\frac{1}{K}\sum_{k}x_l(k),$$

where $$x_l(k) = \begin{cases} 1 & Num_l(k) > R \\ 0 & Num_l(k) \le R \end{cases}$$

and $0<l\le L$, $0<k\le K$; L is a preset window length; for any l greater than 0 and less than or equal to L, $$\frac{1}{K}\sum_{k}x_l(k)$$

is an average value obtained after summation of $x_l(1)$ to $x_l(K)$, K is a quantity of monitoring windows, the monitoring windows include first $\lfloor N/L \rfloor$ windows obtained by dividing N source packets based on the preset window length by using an $l^{th}$ source packet in a monitoring period as a start point, and the N source packets are all source packets that are included from the $l^{th}$ source packet in the monitoring period to a last source packet in the monitoring period; and $Num_l(k)$ is a quantity of lost packets in a $k^{th}$ window in the K monitoring windows, and R is a maximum quantity of lost packets that can be recovered for L source packets by using RET.

With reference to the second aspect and any possible implementation of the second aspect, in a sixth possible implementation of the second aspect, the sending the video quality parameter of the monitored video stream specifically includes: when determining that at least one of video quality parameters of the monitored video stream is greater than or equal to a corresponding threshold, sending the video quality parameter of the monitored video stream to the monitoring device.

Herein each device first collects a corresponding video quality parameter according to the packet loss recovery method that is set, and once determining that the video quality parameter exceeds a corresponding threshold, reports the video quality parameter to the monitoring device. Therefore, reporting is performed only when a video quality parameter exceeds a threshold. This can reduce a quantity of pieces of signaling received by the monitoring device, and reduce processing load of the monitoring device.

With reference to the second aspect and any possible implementation of the second aspect, in a seventh possible implementation of the second aspect, when l is greater than 1, the monitoring windows further include a first window, where the first window is a window constituted by source packets before the $l^{th}$ source packet; and/or when N/L is not an integer, the monitoring windows further include a second window, where the second window is a last window in the windows obtained through window division by using the $l^{th}$ source packet in the monitoring period as the start point.

With reference to the second aspect and any possible implementation of the second aspect, in an eighth possible implementation of the second aspect, when a quantity of source packets in the first window is greater than a first threshold, the monitoring windows include the first window.

In other words, the monitoring windows further include the first window and the first window is used as a monitoring window only when l is greater than 1 and the quantity of source packets in the first window is greater than the first threshold.

With reference to the second aspect and any possible implementation of the second aspect, in a ninth possible implementation of the second aspect, when a quantity of source packets in the second window is greater than a second threshold, the monitoring windows further include the second window.

In other words, the monitoring windows further include the second window and the second window is used as a monitoring window only when N/L is not an integer and the quantity of source packets in the second window is greater than the second threshold.

According to a third aspect, a monitoring device is disclosed and includes: an obtaining unit configured to obtain a video quality parameter of a monitored video stream, where the video quality parameter is determined according to a packet loss recovery method of the monitored video stream, the video quality parameter includes an effective packet loss factor, and the effective packet loss factor is used to indicate effectiveness of network packet loss recovery performed by using the packet loss recovery method of the monitored video stream; and a detection unit configured to perform fault detection based on the video quality parameter of the monitored video stream.

Obviously, the monitoring device provided by this embodiment of the present disclosure determines, according to the packet loss recovery method of the monitored video stream, the video quality parameter that needs to be monitored. The parameter may include the effective packet loss factor, and the effective packet loss factor can indicate effectiveness of network packet loss recovery performed by using the packet loss recovery method. Because compensation of the packet loss recovery method for a packet loss in network transmission is considered, fault detection can be accurately performed on a video service based on the video quality parameter of the monitored video stream. For example, although a network status is poor, and a packet loss rate is relatively high, the effective packet loss factor is relatively low, that is, a lost source packet is recovered effectively by using the packet loss recovery method. Therefore, a video service fault that occurs in this case is not caused by a network fault, but may be caused by a fault of a head end device or a fault of a user terminal. Obviously, the method provided by this embodiment of the present disclosure improves accuracy of fault detection on the video service.

With reference to the third aspect, in a first possible implementation of the third aspect, the device further includes a sending unit, where the sending unit is configured to send a video quality parameter request message to at least one network device, where the video quality parameter request message is used to indicate an identifier of the monitored video stream and the packet loss recovery method of the monitored video stream; for example, if the monitored video stream is a live video stream, the identifier of the monitored video stream may be a channel number or a multicast address and a port; or if the monitored video stream is an on-demand video stream, the identifier of the monitored video stream may be a quintuple; and the obtaining unit is further configured to obtain the video quality parameter of the monitored video stream from the at least one network device.

With reference to the third aspect and any possible implementation of the third aspect, in a second possible implementation of the third aspect, if the packet loss recovery method of the monitored video stream is forward error correction FEC, the video quality parameter includes the following parameter: a first effective packet loss factor, where the first effective packet loss factor is used to indicate effectiveness of network packet loss recovery performed by using FEC; if both RET and FEC are set for the monitored video stream, the video quality parameter includes the following parameters: a maximum consecutive packet loss quantity and a second effective packet loss factor, where the second effective packet loss factor is used to indicate effectiveness of network packet loss recovery performed by using RET and FEC; or if the packet loss recovery method of the monitored video stream is retransmission RET, the video quality parameter includes the following parameters: a packet loss rate, a maximum consecutive packet loss quantity, and a third effective packet loss factor, where the third effective packet loss factor is used to indicate effectiveness of network packet loss recovery performed by using RET.

Obviously, according to the packet loss recovery method such as FEC or RET that is set for the monitored video stream, different video quality parameters are collected. In a scenario in which different packet loss recovery methods are used, when the packet loss rate is considered, compensation of the packet loss recovery method for the network packet loss may be considered. For example, the first effective packet loss factor indicates effectiveness of network packet loss recovery performed by using FEC. Specifically, if the video quality parameter includes the packet loss rate and the first effective packet loss factor, when the first effective packet loss factor is greater than a corresponding threshold, it is determined that an effect of compensation for the network packet loss by using the FEC is not significant. In this case, it may be determined that a video service fault is caused by a network transmission fault.

With reference to the third aspect and any possible implementation of the third aspect, in a third possible implementation of the third aspect, the first effective packet loss factor ELF_F satisfies:

$$\text{ELF\_F} = \frac{1}{L}\sum_{l}\frac{1}{K}\sum_{k}x_l(k),$$

where $$x_l(k) = \begin{cases} 1 & Num_l(k) > R \\ 0 & Num_l(k) \le R \end{cases}$$

and $0 < l \le L$, $0 < k \le K$; L is a source block length that is set when FEC is used for packet loss recovery; for any l greater than 0 and less than or equal to L, $$\frac{1}{K}\sum_{k}x_l(k)$$

is an average value obtained after summation of $x_l(1)$ to $x_l(K)$, K is a quantity of monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and $Num_l(k)$ is a quantity of lost packets in a $k^{th}$ window in the K monitoring windows, and R is a maximum quantity of lost packets that can be recovered for L source packets by using FEC.

With reference to the third aspect and any possible implementation of the third aspect, in a fourth possible implementation of the third aspect, the second effective packet loss factor ELF_FR satisfies:

$$\text{ELF\_FR} = \frac{1}{L}\sum_{l} y(l),$$

where $$y(l) = \begin{cases} 1 & x(l) > \delta \\ 0 & x(l) \le \delta \end{cases}, x(l) = \sum_{k} \text{lost}(k),$$

and $0<l\le L$, $0<k\le K$; L is a source block length that is set when FEC is used for packet loss recovery; for any l greater than 0 and less than or equal to L, K is a quantity of corresponding monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and lost(k) is a quantity of source packets that cannot be recovered in a $k^{th}$ window in the K monitoring windows by using FEC, $\delta$ is a maximum quantity of lost packets that can be recovered for E source packets by using RET, and E is a quantity of source packets in one monitoring period; or the second effective packet loss factor ELF_FR satisfies:

$$\text{ELF\_F} = \frac{1}{L}\sum_{l} \frac{1}{K}\sum_{k} x_l(k),$$

where $$y_l(k) = \begin{cases} 1 & x'_l(k) > R \\ 0 & x'_l(k) \le R \end{cases}, x'_l(k) = \begin{cases} x_l(k) - E' & x_l(k) \ge E' \\ 0 & x_l(k) < E' \end{cases},$$

and $0<l\le L$, $0<k\le K$; L is a source block length that is set when FEC is used for packet loss recovery; for any l greater than 0 and less than or equal to L, $$\frac{1}{K}\sum_{k} x_l(k)$$

is an average value obtained after summation of $y_l(1)$ to $y_l(K)$, K is a quantity of monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and $x_l(k)$ is a quantity of lost packets in a $k^{th}$ window in the K monitoring windows, E' is a quantity of source packets that can be recovered in the $k^{th}$ window by using FEC, and R is a maximum quantity of lost packets that can be recovered for L source packets by using RET.

With reference to the third aspect and any possible implementation of the third aspect, in a fifth possible implementation of the third aspect, the third effective packet loss factor ELF_R satisfies:

$$\text{ELF\_R} = \frac{1}{L}\sum_{l} \frac{1}{K}\sum_{k} x_l(k),$$

where $$x_l(k) = \begin{cases} 1 & \text{Num}_l(k) > R \\ 0 & \text{Num}_l(k) \le R \end{cases}$$

and $0<l\le L$, $0<k\le K$; L is a preset window length; for any l greater than 0 and less than or equal to L, $$\frac{1}{K}\sum_{k} x_l(k)$$

is an average value obtained after summation of $x_l(1)$ to $x_l(K)$, K is a quantity of monitoring windows, the monitoring windows include first $\lfloor N/L \rfloor$ windows obtained by dividing N source packets based on the preset window length by using an $l^{th}$ source packet in a monitoring period as a start point, and the N source packets are all source packets that are included from the $l^{th}$ source packet in the monitoring period to a last source packet in the monitoring period; and $\text{Num}_l(k)$ is a quantity of lost packets in a $k^{th}$ window in the K monitoring windows, and R is a maximum quantity of lost packets that can be recovered for L source packets by using RET.

With reference to the third aspect and any possible implementation of the third aspect, in a sixth possible implementation of the third aspect, the at least one network device includes a first device; and the detection unit is further configured to: if the monitoring device receives, in a monitoring period, a first video quality parameter reported by the first device, determine that a fault occurs between the first device and a head end device, where the head end device is a device that provides the monitored video stream, and the first video quality parameter is reported to the monitoring device after the first device determines that at least one of the first video quality parameters exceeds a corresponding threshold.

With reference to the third aspect and any possible implementation of the third aspect, in a seventh possible implementation of the third aspect, the at least one network device further includes a second device, and the second device is a device downstream of the first device; and the detection unit is further configured to: if the monitoring device receives a second video quality parameter reported by the second device but does not receive the first video quality parameter in the monitoring period, determine that a fault occurs between the first device and the first device, where the second video quality parameter is reported to the monitoring device after the second device determines that at least one of the second video quality parameters exceeds a corresponding threshold; or if the monitoring device does not receive the second video quality parameter and the first video quality parameter in the monitoring period, determine that a fault occurs between the second device and a user terminal, where the user terminal is a device that receives the monitored video stream.

With reference to the third aspect and any possible implementation of the third aspect, in an eighth possible implementation of the third aspect, the at least one network device includes N network devices that the monitored video stream flows through, and N is an integer greater than or equal to 2; and the obtaining unit is further configured to receive a video quality parameter that is of the monitored video stream and is sent by each of the N network devices.

With reference to the third aspect and any possible implementation of the third aspect, in a ninth possible implementation of the third aspect, the detection unit is further configured to: if it is determined that at least one of first video quality parameters reported by a first device among the N network devices is greater than or equal to a corresponding threshold, determine that a fault occurs between the first device and the second device, where the head end device is a device that provides the monitored video stream; or if it is determined that first video quality parameters reported by the first device are all less than corresponding thresholds and that at least one of second video quality parameters reported by a second device downstream of the first device among the N network devices is greater than or equal to a corresponding threshold, determine that a network fault occurs between the first device and the second device.

With reference to the third aspect and any possible implementation of the third aspect, in a tenth possible implementation of the third aspect, the detection unit is further configured to: determine a fault probability of each of M+1 network segments, where the network segment is a network between any two neighboring devices among the first device, M third devices, and the second device, and the third device is a device between the first device and the second device; and determine a network segment with a highest fault probability among the M+1 network segments as a faulty network segment, where M is an integer less than N.

With reference to the third aspect and any possible implementation of the third aspect, in an eleventh possible implementation of the third aspect, the detection unit is further configured to: calculate a fault probability $p_i^Q$ that a fault caused by a $Q^{th}$ parameter in the video quality parameters occurs in an $i^{th}$ network segment, where i is an integer greater than or equal to 1 and less than or equal to M+1, and $p_i^Q$ satisfies:

$$p_i^Q = \begin{cases} \delta_i^Q / \sum_i \delta_i^Q, & \sum_i \delta_i^Q > \lambda_Q \\ 0, & \sum_i \delta_i^Q \leq \lambda_Q \end{cases},$$

where $\delta_i^Q = \theta_{i+1}^Q - \theta_i^Q$, $\theta_{i+1}^Q$ is a $Q^{th}$ parameter reported by an $(i+1)^{th}$ device, $\theta_i^Q$ is a $Q^{th}$ parameter reported by an $i^{th}$ device, $\lambda_Q$ is a threshold corresponding to the $Q^{th}$ parameter, and the $(i+1)^{th}$ device is an upstream device neighboring to the $i^{th}$ device; and determine a fault probability of a parameter whose fault probability is highest in all parameters included in the video quality parameters as a fault probability $p_i$ of the $i^{th}$ network segment.

With reference to the third aspect and any possible implementation of the third aspect, in a twelfth possible implementation of the third aspect, the detection unit is further configured to: calculate a fault probability $p'_i$ of the $i^{th}$ network segment in T consecutive monitoring periods, where T is an integer greater than or equal to 2, and $p'_i$ satisfies:

$$p'_i = \sum_t \beta_t p_i(t),$$

where $\beta_t = 2^{-t}$ and $t \in [1, \ldots, T]$; and update the fault probability of the $i^{th}$ network segment to S, where $$S = p'_i / \sum_i p'_i.$$

With reference to the third aspect and any possible implementation of the third aspect, in a thirteenth possible implementation of the third aspect, when l is greater than 1, the monitoring windows further include a first window, where the first window is a window constituted by source packets before the $i^{th}$ source packet; and/or when N/L is not an integer, the monitoring windows further include a second window, where the second window is a last window in the windows obtained through window division by using the $l^{th}$ source packet in the monitoring period as the start point.

With reference to the third aspect and any possible implementation of the third aspect, in a fourteenth possible implementation of the third aspect, when a quantity of source packets in the first window is greater than a first threshold, the monitoring windows further include the first window.

In other words, the monitoring windows further include the first window and the first window is used as a monitoring window only when l is greater than 1 and the quantity of source packets in the first window is greater than the first threshold.

With reference to the third aspect and any possible implementation of the third aspect, in a fifteenth possible implementation of the third aspect, when a quantity of source packets in the second window is greater than a second threshold, the monitoring windows further include the second window.

In other words, the monitoring windows further include the second window and the second window is used as a monitoring window only when N/L is not an integer and the quantity of source packets in the second window is greater than the second threshold.

According to a fourth aspect, a network device is disclosed and includes: a determining unit configured to determine a video quality parameter of a monitored video stream according to a packet loss recovery method of the monitored video stream, where the video quality parameter includes an effective packet loss factor, and the effective packet loss factor is used to indicate effectiveness of network packet loss recovery performed by using the packet loss recovery method of the monitored video stream; and a sending unit configured to send the video quality parameter of the monitored video stream to a monitoring device.

The network device provided by this embodiment of the present disclosure may determine, according to the packet loss recovery method of the monitored video stream, the video quality parameter that needs to be monitored. The parameter may include the effective packet loss factor, and the effective packet loss factor can indicate effectiveness of network packet loss recovery performed by using the packet loss recovery method. Because compensation of the packet loss recovery method for a packet loss in network transmission is considered, fault detection can be accurately performed on a video service based on the video quality parameter of the monitored video stream. For example, although a network status is poor, and a packet loss rate is relatively high, the effective packet loss factor is relatively low, that is, a lost source packet is recovered effectively by using the packet loss recovery method. Therefore, a video service fault that occurs in this case is not caused by a network fault, but may be caused by a fault of a head end device or a fault of a user terminal. In conclusion, the method provided by this embodiment of the present disclosure improves accuracy of fault detection on the video service.

With reference to the fourth aspect, in a first possible implementation of the fourth aspect, the network device further includes a receiving unit configured to receive a video quality parameter request message sent by the monitoring device, where the video quality parameter request message is used to indicate an identifier of the monitored video stream and the packet loss recovery method of the monitored video stream.

Therefore, the network device can monitor the corresponding video quality parameter according to the packet loss recovery method of the monitored video stream, so that the monitoring device can accurately perform fault detection on the video service based on the video quality parameter.

With reference to the fourth aspect, in a second possible implementation of the fourth aspect, the determining unit is further configured to: if the packet loss recovery method of the monitored video stream is forward error correction FEC, and the video quality parameter includes a first effective packet loss factor, determine the first effective packet loss factor; if both RET and FEC are set for the monitored video stream, determine that the video quality parameter includes a maximum consecutive packet loss quantity and a second effective packet loss factor, and determine the maximum consecutive packet loss quantity and the second effective packet loss factor; or if the packet loss recovery method of the monitored video stream is retransmission RET, and the video quality parameter includes a packet loss rate, a maximum consecutive packet loss quantity, and a third effective packet loss factor, the determining unit is configured to determine the maximum consecutive packet loss quantity, the packet loss rate, and the third effective packet loss factor.

Obviously, according to the packet loss recovery method such as FEC or RET that is set for the monitored video stream, different video quality parameters are collected. In a scenario in which different packet loss recovery methods are used, when the packet loss rate is considered, compensation of the packet loss recovery method for the network packet loss may be considered. For example, the first effective packet loss factor indicates effectiveness of network packet loss recovery performed by using FEC. Specifically, if the video quality parameter includes the packet loss rate and the first effective packet loss factor, when the first effective packet loss factor is greater than a corresponding threshold, it is determined that an effect of compensation for the network packet loss by using the FEC is not significant. In this case, it may be determined that a video service fault is caused by a network transmission fault.

With reference to the fourth aspect and any possible implementation of the fourth aspect, in a third possible implementation of the fourth aspect, the first effective packet loss factor ELF_F satisfies:

$$\text{ELF\_F} = \frac{1}{L}\sum_l \frac{1}{K}\sum_k x_l(k),$$

where $$x_l(k) = \begin{cases} 1 & Num_l(k) > R \\ 0 & Num_l(k) \leq R \end{cases}$$

and $0<l\leq L$, $0<k\leq K$; L and is a source block length that is set when FEC is used for packet loss recovery; for any l greater than 0 and less than or equal to L, $$\frac{1}{K}\sum_k x_l(k)$$

is an average value obtained after summation of $x_l(1)$ to $x_l(K)$, K is a quantity of monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and $Num_l(k)$ is a quantity of lost packets in a $k^{th}$ window in the K monitoring windows, and R is a quantity of redundant packets of a single source block that is set when FEC is used for packet loss recovery.

With reference to the fourth aspect and any possible implementation of the fourth aspect, in a fourth possible implementation of the fourth aspect, the second effective packet loss factor ELF_FR satisfies:

$$\text{ELF\_FR} = \frac{1}{L}\sum_l y(l),$$

where $$y(l) = \begin{cases} 1 & x(l) > \delta \\ 0 & x(l) \leq \delta \end{cases}, x(l) = \sum_k \text{lost}(k),$$

and $0<l\leq L$, $0<k\leq K$; L is a source block length that is set when FEC is used for packet loss recovery; for any l greater than 0 and less than or equal to L, K is a quantity of corresponding monitoring windows, the monitoring windows include first $\lfloor N/L \rfloor$ windows obtained by dividing N source packets based on the source block length by using an $i^{th}$ source packet in a monitoring period as a start point, and the N source packets are all source packets that are included from the $l^{th}$ source packet in the monitoring period to a last source packet in the monitoring period; and lost(k) is a quantity of source packets that cannot be recovered in a $k^{th}$ window in the K monitoring windows by using FEC, δ is a maximum quantity of lost packets that can be recovered for E source packets by using RET, and E is a quantity of source packets in one monitoring period; or the second effective packet loss factor ELF_FR satisfies:

$$\text{ELF\_FR} = \frac{1}{L}\sum_l \frac{1}{K}\sum_k y_l(k),$$

where $$y_l(k) = \begin{cases} 1 & x'_l(k) > R \\ 0 & x'_l(k) \le R \end{cases}, x'_l(k) = \begin{cases} x_l(k) - E' & x_l(k) \ge E' \\ 0 & x_l(k) < E' \end{cases},$$

and $0 < l \le L$, $0 < k \le K$; L is a source block length that is set when FEC is used for packet loss recovery; for any l greater than 0 and less than or equal to L $$\frac{1}{K}\sum_k y_l(k)$$

is an average value obtained after summation of $y_l(1)$ to $y_l(K)$, K is a quantity of monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period; and $x_l(k)$ is a quantity of lost packets in a $k^{th}$ window in the K monitoring windows, E' is a quantity of source packets that can be recovered in the $k^{th}$ window by using FEC, and R is a maximum quantity of lost packets that can be recovered for L source packets by using RET.

With reference to the fourth aspect and any possible implementation of the fourth aspect, in a fifth possible implementation of the fourth aspect, the third effective packet loss factor ELF_R satisfies:

$$\text{ELF\_R} = \frac{1}{L}\sum_l \frac{1}{K}\sum_k x_l(k),$$

where $$x_l(k) = \begin{cases} 1 & \text{Num}_l(k) > R \\ 0 & \text{Num}_l(k) \le R \end{cases}$$

and $0 < l \le L$, $0 < k \le K$; L is a preset window length; for any l greater than 0 and less than or equal to L $$\frac{1}{K}\sum_k x_l(k)$$

is an average value obtained after summation of $x_l(1)$ to $x_l(K)$, K is a quantity of monitoring windows, the monitoring windows include first $\lfloor N/L \rfloor$ windows obtained by dividing N source packets based on the preset window length by using an $l^{th}$ source packet in a monitoring period as a start point, and the N source packets are all source packets that are included from the $l^{th}$ source packet in the monitoring period to a last source packet in the monitoring period; and $\text{Num}_l(k)$ is a quantity of lost packets in a $k^{th}$ window in the K monitoring windows, and R is a maximum quantity of lost packets that can be recovered for L source packets by using RET.

With reference to the fourth aspect and any possible implementation of the fourth aspect, in a sixth possible implementation of the fourth aspect, the sending unit is further configured to: when it is determined that at least one of video quality parameters of the monitored video stream is greater than or equal to a corresponding threshold, send the video quality parameter of the monitored video stream to the monitoring device.

With reference to the fourth aspect and any possible implementation of the fourth aspect, in a seventh possible implementation of the fourth aspect, when l is greater than 1, the monitoring windows further include a first window, where the first window is a window constituted by source packets before the $l^{th}$ source packet; and/or when N/L is not an integer, the monitoring windows further include a second window, where the second window is a last window in the windows obtained through window division by using the $l^{th}$ source packet in the monitoring period as the start point.

With reference to the fourth aspect and any possible implementation of the fourth aspect, in an eighth possible implementation of the fourth aspect, when a quantity of source packets in the first window is greater than a first threshold, the monitoring windows further include the first window.

In other words, the monitoring windows further include the first window and the first window is used as a monitoring window only when l is greater than 1 and the quantity of source packets in the first window is greater than the first threshold.

With reference to the fourth aspect and any possible implementation of the fourth aspect, in a ninth possible implementation of the fourth aspect, when a quantity of source packets in the second window is greater than a second threshold, the monitoring windows further include the second window.

In other words, the monitoring windows further include the second window and the second window is used as a monitoring window only when N/L is not an integer and the quantity of source packets in the second window is greater than the second threshold.

According to a fifth aspect, an embodiment of the present disclosure provides a monitoring device, where the monitoring device may include at least one processor, a memory, a communications interface, and a communications bus; the at least one processor is connected to the memory and the communications interface by using the communications bus; the memory is configured to store a computer-executable instruction; and when the monitoring device runs, the processor executes the computer-executable instruction stored in the memory, so that the monitoring device performs the fault detection method according to the first aspect or any possible implementation of the first aspect.

According to a sixth aspect, an embodiment of the present disclosure provides a network device, where the network device may include at least one processor, a memory, a communications interface, and a communications bus; the at least one processor is connected to the memory and the communications interface by using the communications bus; the memory is configured to store a computer-executable instruction; and when the network device runs, the processor executes the computer-executable instruction stored in the memory, so that the device performs the fault detection method according to the second aspect or any possible implementation of the second aspect.

According to a seventh aspect, an embodiment of the present disclosure provides a computer storage medium configured to store a computer software instruction used by the foregoing monitoring device, where the computer software instruction includes a program used to perform the foregoing fault detection method.

According to an eighth aspect, an embodiment of the present disclosure provides a computer storage medium configured to store a computer software instruction used by the foregoing device, where the computer software instruction includes a program used to perform the foregoing fault detection method.

DESCRIPTION OF EMBODIMENTS

The following describes the technical solutions in the embodiments of the present disclosure in detail with reference to the accompanying drawings in the embodiments of the present disclosure.

Figure 1:
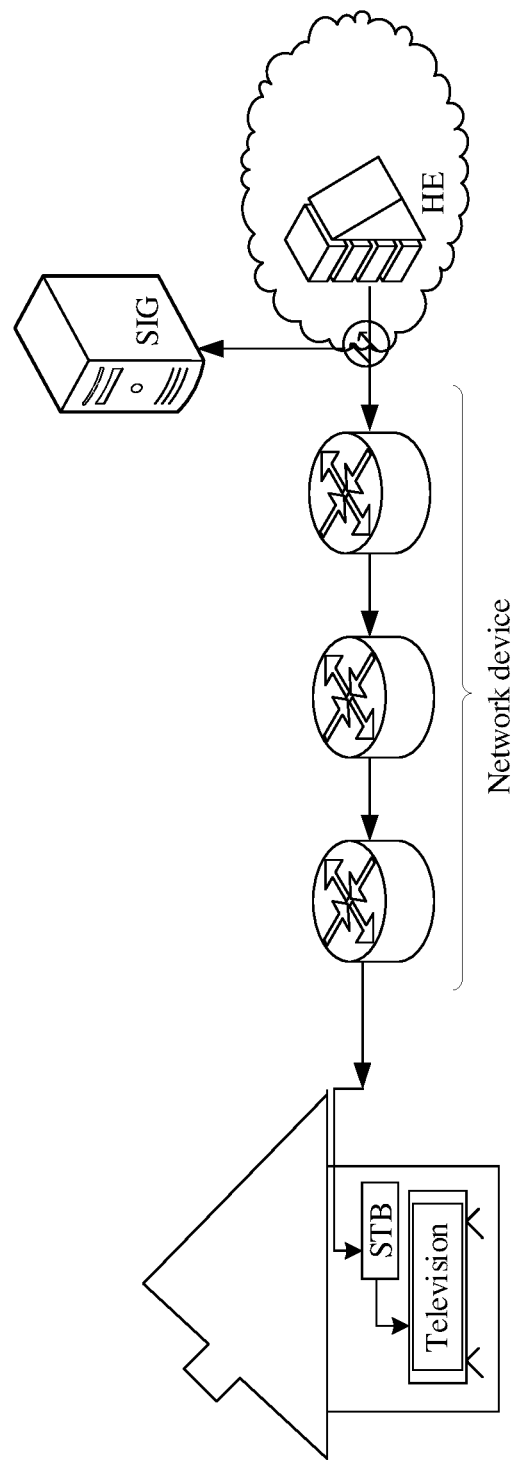
FIG. 1 is a schematic diagram of a conventional IPTV video service.

As shown in FIG. 1, for an IPTV video service, an operator provides a headend device (HE) and a user terminal. The HE provides an IPTV video source, encodes the video source into a video stream, and then divides the video stream into a plurality of source packets, where the source packets are transmitted by network devices such as a content delivery network (CDN) and a broadband remote access server (BRAS) to the user terminal such as an STB and then are transmitted by the set top box to a display device (such as a television) for displaying. In a process of transmitting the video stream from the head end device to a first network device, the video stream can be further transmitted to a service inspection gateway (SIG) in a manner of mirror delivery. Usually, in a transmission process, a packet loss or a delay may occur due to impact of a network status, and further, the video service is affected. For example, erratic display occurs when the display device performs playback.

In some approaches, a media loss rate (MLR) and a delay factor (DF) in a transmission process of a source packet may be used to represent impact of a network status on video service quality. The packet loss rate is a ratio of a quantity of lost source packets to a quantity of source packets to be transmitted in a process of transmitting a monitored video stream from a head end device to a user terminal.

For example, before transmission, the head end device encodes a video source into 10 source packets, that is, there are 10 source packets to be transmitted, and after the source packets are transmitted by devices such as a core router (CR), the user terminal receives eight source packets. This indicates that two source packets are lost in a network transmission process. Therefore, the packet loss rate is 2/10, that is, 20%. In addition, the DF is used to represent a change rate of a cache occupied by the video stream in a monitoring period. Specifically, when a DF value is very large, it indicates a very quick change of the cache occupied by the video stream in the monitoring period, and therefore indicates that a source packet suddenly arrives very quickly or suddenly arrives very slowly, and further indicates that a network is unstable; or when a DF value is very small, it indicates a very small change of the cache occupied by the video stream in the monitoring period, and therefore indicates that a network is relatively stable.

When a network operation status is monitored in real time, thresholds of the DF and the MLR may be preset. Once it is found that the DF and the MLR are lower than or higher than the thresholds, an alarm may be generated in time.

Figure 2:
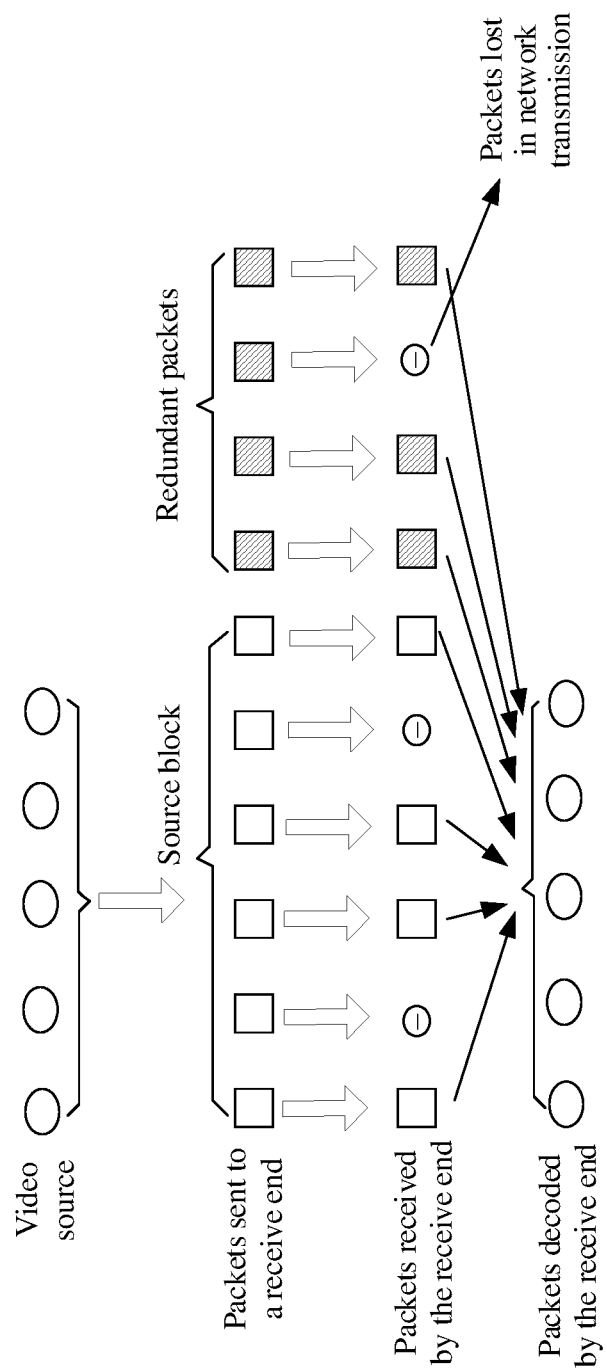
FIG. 2 is a schematic diagram of a conventional FEC technology.

Currently, an operator uses a plurality of packet loss recovery methods such as FEC and RET technologies to reduce adverse impact of network quality on media transmission. FEC is to insert redundant packets into an original video stream to improve a network packet loss concealment capability of a media service. Specifically, referring to FIG. 2, the head end device splits a video source into several source packets of a same size, groups every k source packets into one source block, and encodes and generates n redundant packets for each source block. Then the head end device sends the source blocks and the redundant packets to the user terminal. After network transmission, m packets are received at a receive end. For a source block, as long as a quantity of packets received by the user terminal is greater than a quantity of source packets, that is, m≥k, k source packets can be recovered by using the received packets.

In addition, after a RET algorithm is deployed, and after a packet loss is detected, the user terminal may initiate a retransmission request to a RET server, requesting the RET server to transmit a lost source packet, to ensure media service quality.

Figure 3:
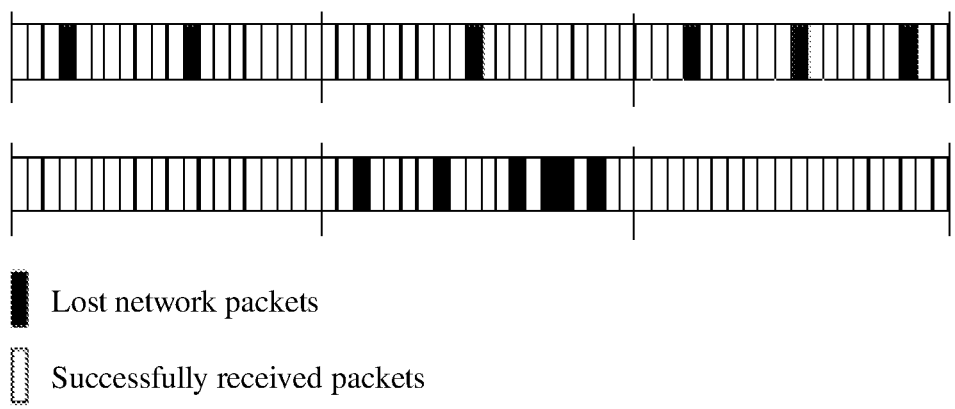
FIG. 3 is a schematic diagram of different packet loss distributions according to an embodiment of the present disclosure.

When a packet loss recovery method is used, sensitivity of the media service to the packet loss rate also changes. Using FEC as an example, and referring to FIG. 3, if the packet loss rate is lower than the threshold and a packet loss distribution is relatively centralized, an STB cannot use a FEC algorithm to recover a source packet transmitted by the video head end. When a display device performs playback, erratic display occurs, and video experience of a user is affected by a network packet loss. However, because the packet loss rate is lower than the threshold, after a video service fault occurs, a person skilled in the art considers that the video service fault is not caused by network transmission. Alternatively, if the packet loss rate is higher than the threshold but a packet loss distribution is relatively sparse, an STB can use a FEC algorithm to recover a source data block transmitted by the video head end, and video experience of a user is not affected. However, because the packet loss rate is higher than the threshold, after a video service fault occurs, a person skilled in the art considers that the video service fault is caused by network transmission.

In some approaches, when fault detection is performed on a video service, packet loss recovery methods such as FEC and RET that are used by the operator are not considered, and impact of network transmission on video service quality cannot be accurately reflected, and therefore fault detection cannot be performed accurately. For example, if the FEC algorithm is deployed on the video head end and the STB, but the packet loss rate is lower than the threshold and the packet loss distribution is relatively centralized, the STB cannot use the FEC algorithm to recover the source data block transmitted by the video head end. When the display device performs playback, erratic display occurs, and video experience of the user is affected by the network packet loss. However, because the packet loss rate is lower than the threshold, a person skilled in the art considers that the video service fault is not caused by network transmission.

Embodiments of the present disclosure provide a fault detection method. A basic principle of the method is as follows: A network device that a monitored video stream flows through monitors different demarcation indicators (that is, video quality parameters described in the embodiments of the present disclosure) according to different packet loss recovery methods (FEC and RET) used by an operator. The indicators are determined according to the used packet loss recovery methods. Because compensation of the packet loss recovery method for a packet loss in network transmission is considered, impact of network transmission quality on video service quality is accurately reflected. Further, when performing fault detection, a monitoring device can accurately determine the impact of network transmission quality on video service quality based on a video quality parameter reported by a device, and therefore accuracy of fault detection on a video service is improved. For example, although a network status is poor, and a packet loss rate is relatively high, a lost source packet is recovered by using the packet loss recovery method. Therefore, a video service fault that occurs in this case is not caused by a network fault, but may be caused by a fault of a head end device or a fault of a user terminal.

It should be noted that, "fault detection" used in the embodiments of the present disclosure may include detecting whether a fault occurs and performing fault demarcation. The fault demarcation is to determine a faulty device or network segment when a video service fault occurs, for example, erratic display or frame freezing occurs when a display device performs playback.

The following describes implementations of the embodiments of the present disclosure in detail with reference to the accompanying drawings.

Figure 4:
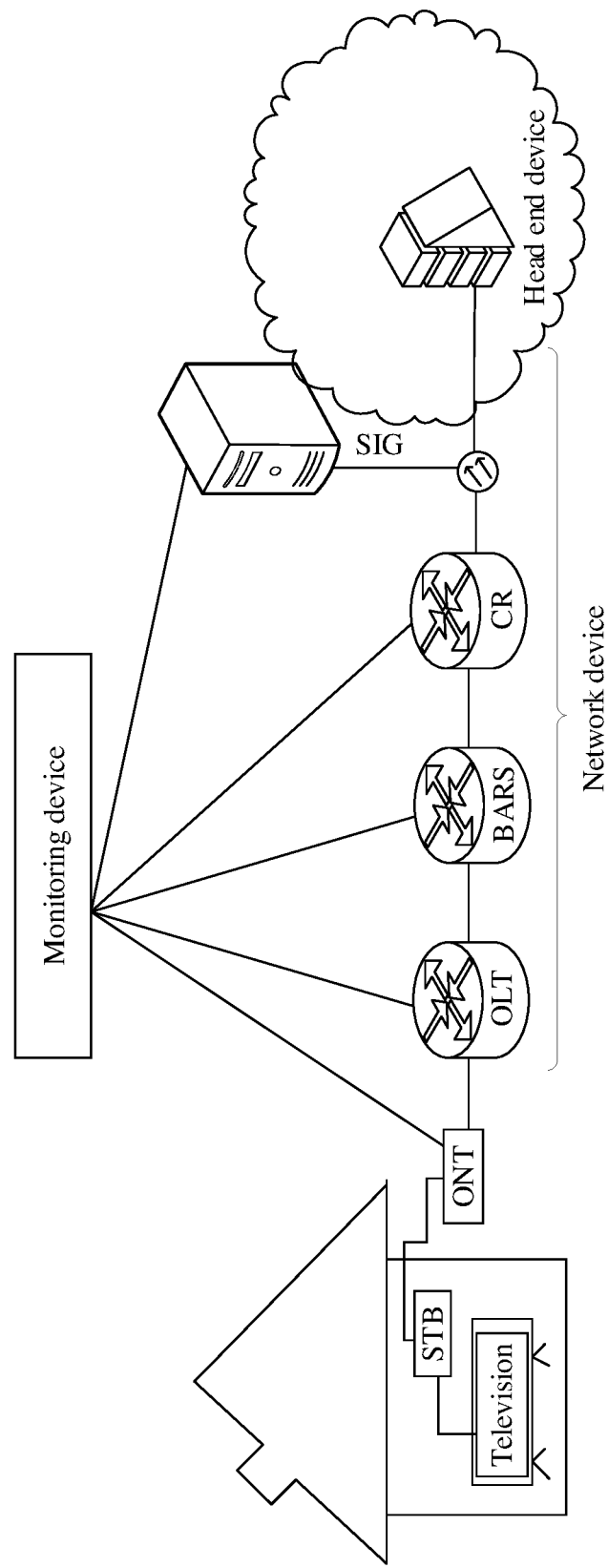
FIG. 4 is a schematic diagram of a video quality monitoring system according to an embodiment of the present disclosure.

An embodiment of the present disclosure provides a video quality monitoring system. As shown in FIG. 4, the video quality monitoring system includes a head end device, network devices that a monitored video stream flows through, a user terminal, and a monitoring device.

The head end device is configured to provide a video source, transcode the video source into a video stream of a constant bit rate (including a plurality of source packets), and deliver the video stream to a device nearest to the head end device by live broadcast. The head end device may be a HE server. In addition, the head end device delivers the video stream to a SIG in a manner of mirror delivery. In this embodiment of the present disclosure, the network devices that the monitored video stream flows through may be devices such as a BARS, an optical network terminal (ONT), an optical line terminal (OLT), and a CR, in addition to the SIG.

The user terminal is configured to receive the video stream, and may be an STB.

It should be noted that, in this embodiment of the present disclosure, a transmission direction of the video stream may be considered as from upstream (that is, a direction toward the head end device) to downstream (that is, a direction toward the user terminal). In addition, among the network devices that the monitored video stream flows through, the device nearest to the head end device may be referred to as a most upstream device; and among the network devices that the monitored video stream flows through, a device nearest to the user terminal may be referred to as a most downstream device. In this embodiment of the present disclosure, the SIG may be considered as the most upstream device, and the ONT may be considered as the most downstream device.

Usually, if a video quality parameter monitored by a device exceeds a corresponding threshold, it may be considered that a fault occurs upstream of the network device. For example, a probe may be deployed on the SIG. When a video quality parameter monitored by the probe deployed on the SIG exceeds a corresponding threshold, it may be considered that a fault occurs upstream of the SIG. Because only the head end device exists upstream of the SIG, it may be considered that the head end is faulty. It should be noted that, if a probe is deployed on an inbound port of a device, devices upstream of the network device do not include the network device; or if a probe is deployed on an outbound port of the network device, devices upstream of the network device include the network device.

Referring to the video quality monitoring system shown in FIG. 4, the ONT is the network device nearest to the user terminal, that is, the most downstream device, and the SIG is the network device nearest to the head end device, that is, the most upstream device.

The CR includes a central processing unit (CPU), a random-access memory (RAM), a dynamic RAM (DRAM), a flash memory, a non-volatile RAM (NV-RAM), a read-only memory (ROM), and various interfaces. The BRAS mainly includes a service management module and a service forwarding module. The OLT includes a main control board, a service board, an interface board, a power board, and the like.

When the video stream is transmitted from the head end device to the user terminal (e.g., STB), due to a change of a network status, a source packet of the video stream may encounter an abnormal phenomenon, for example, a packet loss, a delay, a jitter, or disorder. The abnormal phenomenon causes a defect, for example, erratic display of a video picture played back on a terminal screen. As a result, video service quality is faulty. Therefore, a collection module may be deployed on each device in the video quality monitoring system to monitor video quality parameters, for example, parameters such as a packet loss rate, and a delay and jitter, to perform fault detection on a video service based on the parameters.

Figure 5:
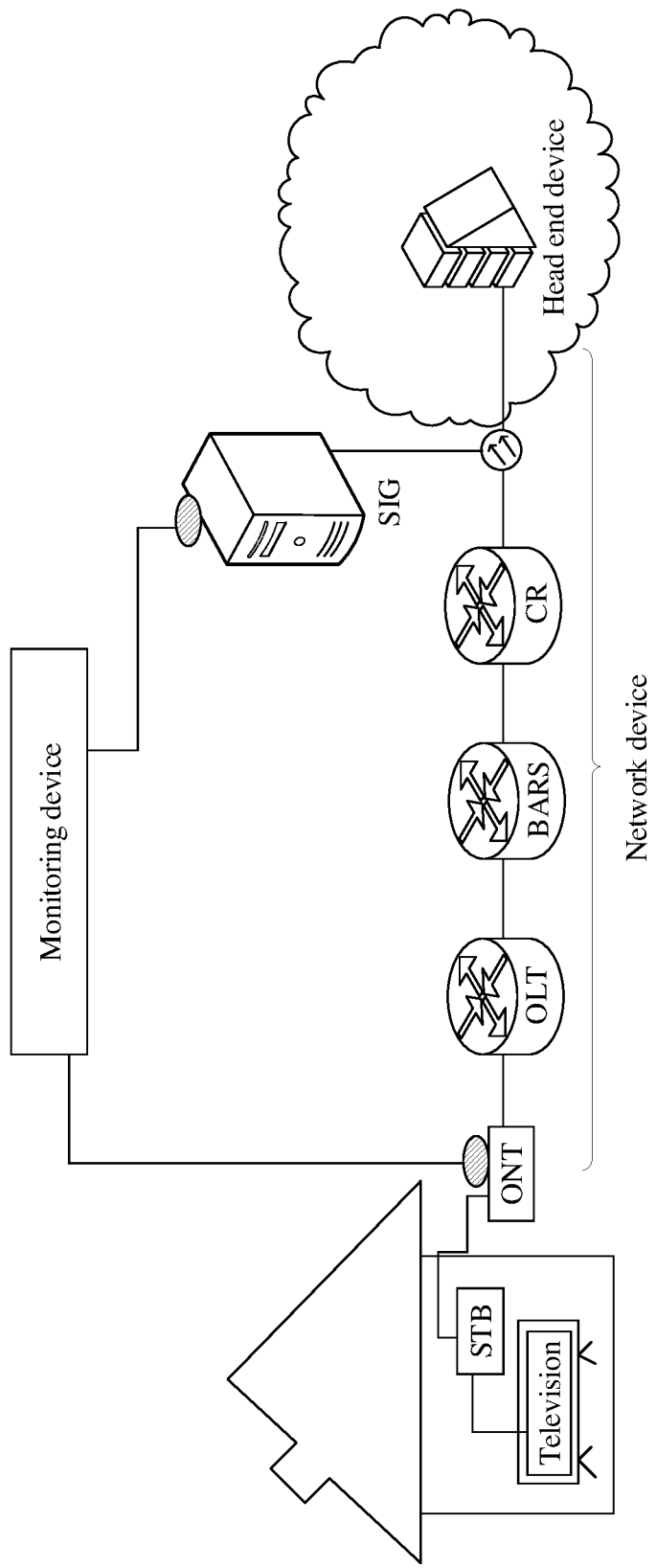
FIG. 5 is a schematic diagram of fault detection deployment according to an embodiment of the present disclosure.

Based on different manners of deploying collection modules, there are mainly the following two typical deployment scenarios:

1. Referring to FIG. 5, collection modules are deployed on the ONT and the SIG, and fault detection may be implemented on the video service by monitoring video quality parameters collected on the ONT and the SIG. Specifically, whether the video service fault is caused by a fault of the user terminal, or caused by a network fault, or caused by a fault of the head end device may be determined.

For example, after the video service fault occurs, fault detection is performed based on the video quality parameters collected on the ONT and the SIG. If a video quality parameter collected on the ONT exceeds a threshold, it may be considered that the video service fault is caused by a network fault. If a video quality parameter collected on the SIG exceeds a threshold, it may be considered that the video service fault is caused by a fault of the head end device. If neither of video quality parameters collected on the ONT and the SIG exceeds a threshold, it may be considered that the video service fault is caused by a fault of the user terminal.

Figure 6:
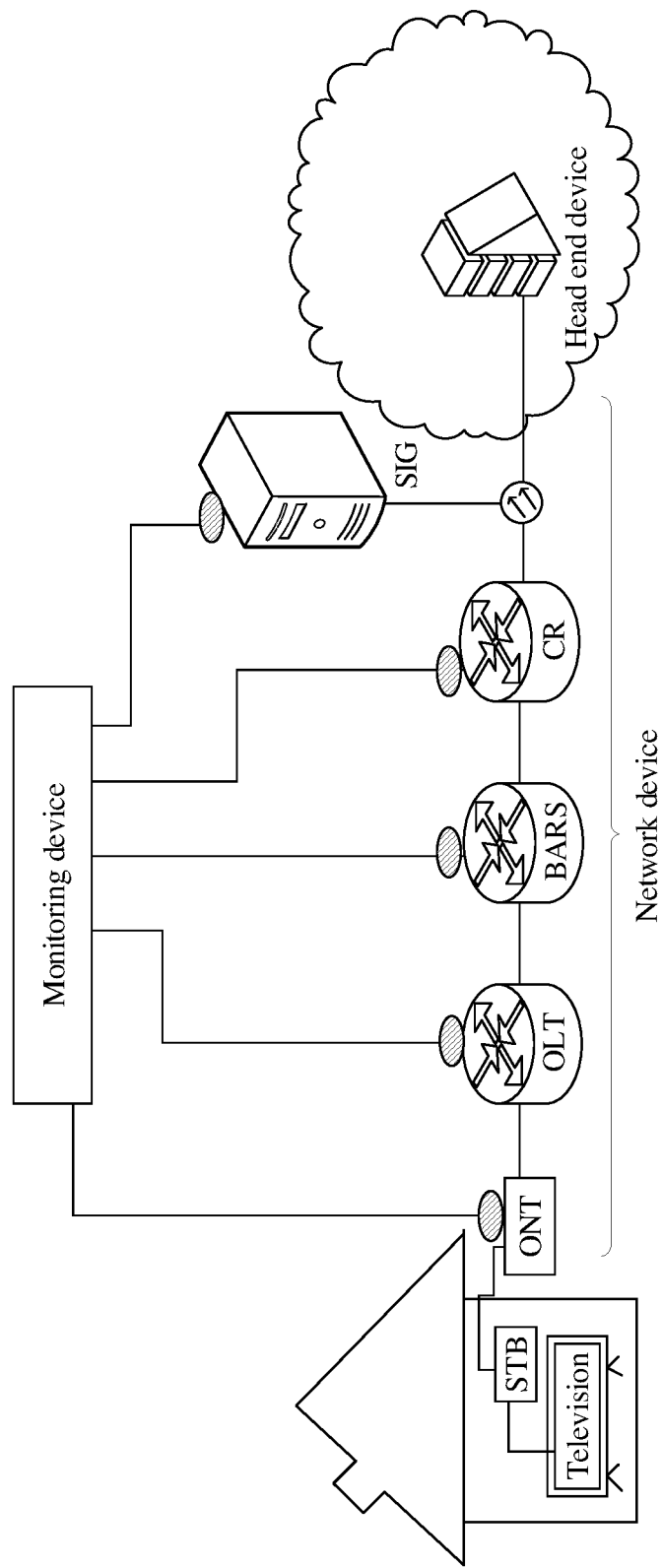
FIG. 6 is another schematic diagram of fault detection deployment according to an embodiment of the present disclosure.

2. Referring to FIG. 6, collection modules may be deployed on network devices such as the ONT, the OLT, the BARS, the CR, and the SIG, and configured to collect video quality parameters. For example, the collection modules may be deployed on a CPU of the CR, deployed on a main control CPU of the service management module of the BARS, and deployed on a CPU of the main control board of the OLT.

The collection modules are deployed on a plurality of devices shown in FIG. 6, and the video service fault may be demarcated in a specific network segment or on a specific device. In this embodiment of the present disclosure, if a video quality parameter collected on the ONT exceeds a threshold, it may be considered that the video service fault is caused by a network fault. Further, which network segment is faulty may be specifically determined based on video quality parameters reported by two neighboring devices. Specifically, among all the devices transmitting the video stream, a network between any two neighboring devices is referred to as a network segment. A fault probability of each network segment is determined, a network segment with a highest fault probability in the network segments is determined, and it may be considered that the video service fault is caused by a fault of the network segment.

Figure 7:
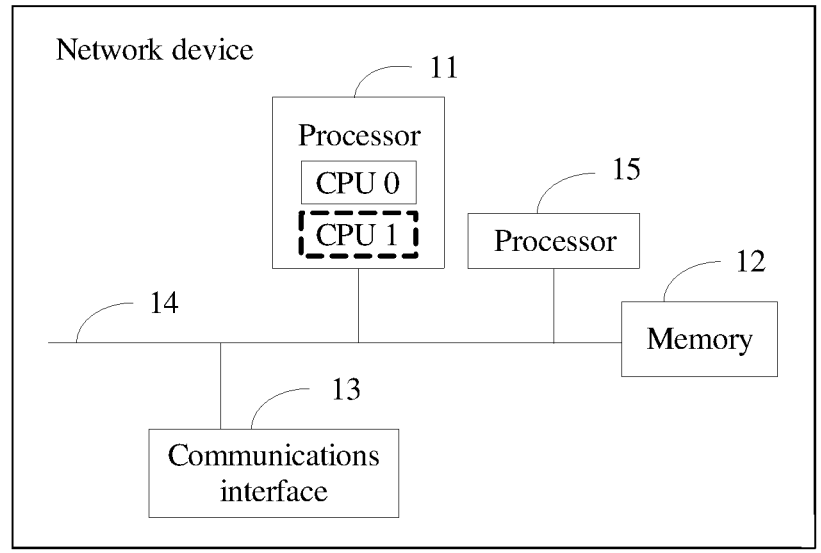
FIG. 7 is a schematic structural diagram of a network device according to an embodiment of the present disclosure.

FIG. 7 is a schematic structural diagram of a network device according to an embodiment of the present disclosure. The network device may be a network device that a monitored video stream flows through in this embodiment of the present disclosure, for example, a network device such as the BARS, the ONT, the OLT, the CR, or the SIG in the video quality monitoring system shown in FIG. 4. As shown in FIG. 7, the network device may include at least one processor 11, a memory 12, and a communications interface 13.

The following describes each component of the network device in detail with reference to FIG. 7.

The processor 11 is a control center of the network device, and may be one processor, or may be a collective term for a plurality of processing elements. For example, the processor 11 is a CPU, an application-specific integrated circuit (ASIC), or one or more integrated circuits configured to implement this embodiment of the present disclosure, for example, one or more digital signal processor (DSP), or one or more field-programmable gate arrays (FPGAs).

The processor 11 may perform various functions of the network device by running or executing a software program stored in the memory 12 and invoking data stored in the memory 12.

In a specific implementation, in an embodiment, the processor 11 may include one or more CPUs, for example, a CPU 0 and a CPU 1 in FIG. 7.

In a specific implementation, in an embodiment, the network device may include a plurality of processors, for example, the processor 11 and a processor 15 in FIG. 7. Each of the processors may be a single-core (single-CPU) processor, or may be a multi-core (multi-CPU) processor. The processor herein may be one or more processing cores used for processing data (for example, a computer program instruction).

The memory 12 may be a ROM or another type of static storage network device capable of storing static information and instructions, or a RAM or another type of dynamic storage network device capable of storing information and instructions, or may be an electrically erasable programmable ROM (EEPROM), a compact disc read-only memory (CD-ROM), or other compact disc storage or optical disc storage (including a compressed optical disc, a laser disc, an optical disc, a digital versatile disc, a Blu-ray disc, or the like), a magnetic disk storage medium or another magnetic storage network device, or any other medium capable of carrying or storing expected program code in a form of instructions or data structures and capable of being accessed by a computer. This is not limited. The memory 12 may exist independently, and is connected to the processor 11 by using a communications bus 14. The memory 12 may also be integrated with the processor 11.

The memory 12 is configured to store a software program for executing the solution of the present disclosure, where the software program is executed under control of the processor 11.

The communications interface 13 may include two communications interfaces: a sending interface for sending data to an external network device (for example, an upstream network device or a downlink network device neighboring to the network device in FIG. 4, or the monitoring device shown in FIG. 4) and a receiving interface for receiving data from an external network device. To be specific, the network device may receive data and send data separately by using two different communications interfaces. Certainly, the communications interface 13 may integrate a data receiving function and a data sending function into one communications interface, and the communications interface has the data receiving function and the data sending function.

A structure of the network device shown in FIG. 7 does not constitute a limitation to the network device. A quantity of components included may be greater or less than that shown in the figure, or some components are combined, or component arrangements are different.

In this embodiment of the present disclosure, according to different packet loss recovery methods set for the monitored video stream, different video quality parameters are used to represent adverse impact of network transmission on media quality and user experience. The monitored video stream may be a video stream of a specific channel or a video stream of a user terminal. In this embodiment of the present disclosure, a video quality parameter determined by each device in the video quality monitoring system in the following four scenarios is described: a scenario in which no packet loss recovery method is set, a scenario in which only FEC is set, a scenario in which only RET is set, and a scenario in which both FEC and RET are set.

1. In the scenario in which no packet loss recovery method is used, a video quality parameter determined by the device is a packet loss rate RTP_LR, that is, a ratio of a quantity of source packets lost in a video stream transmission process to a quantity of source packets to be transmitted (that is, a plurality of source packets obtained by a head end device by dividing a video stream monitored by a monitoring device).

When calculating RTP_LR, the device first creates a cache queue, sorts received Real-Time Transport Protocol (RTP) packets (that is, the source packets), then detects a packet loss by using sequence numbers of sorted RTP packet headers, and calculates RTP_LR.

In addition, a delay and a jitter in a process of transmitting the RTP packets to the network device cause underflow of a decoder. The device may further convert the underflow of the decoder into packet loss processing. The underflow of the decoder means that the user terminal has a cache, and if a delay of an RTP packet is very long, the cache becomes empty; in this case, a decoding error occurs in a decoder of the user terminal; and an RTP packet subsequently arriving at the cache of the receive end cannot be decoded but is directly discarded. In a specific implementation, the device may set a size of the cache queue approximately to a size of a decoding cache of the head end device.

Specifically, RTP_LR satisfies the following formula (1):

$$\text{RTP\_LR} = \frac{losspktNum}{expectedpktNum} \quad (1)$$

where losspktNum indicates a quantity of lost RTP packets, and expectedpktNum indicates a quantity of RTP packets (that is, the source packets in this embodiment of the present disclosure) expected to be received. For example, referring to FIG. 4, and assuming that the head end device divides the video source of the monitored video stream into t source packets, for a subsequent device, a quantity of source packets expected to be received is also t.

2. In the scenario in which only FEC is set, video quality parameters determined by the device include RTP_LR and an effective packet loss factor in a scenario of FEC. The effective packet loss factor in the scenario of FEC is a first effective packet loss factor described in this embodiment of the present disclosure, and may be an effective packet loss factor a used to indicate a probability of failing to perform network packet loss recovery by using FEC, or certainly may be an effective packet loss factor b used to indicate a probability of effectively performing network packet loss recovery by using FEC, where b=1−a. Both a and b may indicate effectiveness of recovering a lost network packet by using FEC. Subsequently a method for calculating the first effective packet loss factor is described only by using an example in which the first effective packet loss factor for FEC (ELF_F) is used to indicate a probability of failing to perform network packet loss recovery by using FEC.

In a specific implementation, ELF_F (that is, the effective packet loss factor a) satisfies the following formula (2):

$$\text{ELF\_F} = \frac{1}{L} \sum_{l} \frac{1}{K} \sum_{k} x_l(k) \quad (2)$$

where $$x_l(k) = \begin{cases} 1, & Num_l(k) > R \\ 0, & Num_l(k) \le R \end{cases},$$

and $0 < l \le L$, $0 < k \le K$.

In addition, as can be learned from above, a value range of ELF_F is $0 \le \text{ELF\_F} \le 1$.

It should be noted that, when FEC is used, a plurality of source packets corresponding to the video source need to be grouped into a plurality of source blocks of a same size, where a quantity of source packets included in each source block is the same. For example, every 100 source packets are grouped into one source block. Further, a plurality of redundant packets are encoded and generated for each source block, and a quantity of redundant packets corresponding to each source block is the same. Herein L is a source block length that is set when FEC is used for packet loss recovery, that is, the quantity of source packets included in each source block, for example, 100.

$$\frac{1}{K} \sum_{k} x_l(k)$$

For any l greater than 0 and less than or equal to L in the formula (2) is an average value obtained after summation of $x_l(1)$ to $x_l(K)$, K in the formula (2) is a quantity of monitoring windows, the monitoring windows include first $\lfloor N/L \rfloor$ windows obtained by dividing N source packets based on the source block length by using an $l^{th}$ source packet in a monitoring period as a start point, and the N source packets are all source packets that are included from the $l^{th}$ source packet in the monitoring period to a last source packet in the monitoring period. It should be noted that, the N source packets include the $l^{th}$ source packet and the last source packet in the monitoring period. $\lfloor * \rfloor$ represents round-down of *. For example, if N/L=5.2, 5.2 is rounded down and 5 is obtained. For example, for an l, if the monitoring windows include and only include the first $\lfloor N/L \rfloor$ windows, and $\lfloor N/L \rfloor$=5, K corresponding to the l is 5.

R is a maximum quantity of lost packets that can be recovered for L source packets by using FEC, and is usually a quantity of redundant packets of a single source block that is set when FEC is used for packet loss recovery. For example, if five redundant packets are encoded and generated for each source block, R is 5.

$Num_l(k)$ indicates a quantity of lost packets in a $k^{th}$ window during an $l^{th}$ slide, that is, a quantity of lost packets in the $k^{th}$ window in the K monitoring windows, and R is a quantity of redundant packets of a single source block that is set when FEC is used for packet loss recovery. It should be noted that, the slide is window division based on the source block length by using a source packet as a start point in a sequence of transmitting source packets. For example, assuming that 100 source packets need to be transmitted in the monitoring period, and that the source block length is 5, window division during an $l^{th}$ slide means dividing every five source packets into one window by using an $l^{th}$ source packet in the 100 source packets as a start point; and source block division during an eighth slide means dividing every five source packets into one window by using an eighth source packet in the 100 source packets as a start point.

In addition, the monitoring period may be an observation period that is manually set, for example, 10 s.

3. In the scenario in which both FEC and RET are set, video quality parameters determined by the device include a packet loss rate RTP_LR, a maximum consecutive packet loss length RTP_LP, and an effective packet loss factor in a scenario of RET and FEC, that is, a second effective packet loss factor described in this embodiment of the present disclosure. The second effective packet loss factor may be an effective packet loss factor m used to indicate a probability of failing to perform packet loss recovery by using RET and FEC, or may be an effective packet loss factor n used to indicate a probability of effectively performing packet loss recovery by using RET and FEC, where m=1−n. Both n and m may indicate effectiveness of recovering a lost network packet by using RET and FEC. Subsequently a method for calculating the second effective packet loss factor is described only by using an example in which the second effective packet loss factor is an effective packet loss factor ELF_FR (effective loss factor for FEC and RET) used to indicate a probability of failing to perform packet loss recovery by using RET and FEC.

ELF_FR (that is, the effective packet loss factor m) satisfies the following formula (3):

$$\mathrm{ELF\_FR} = \frac{1}{L}\sum_{l} y(l) \quad (3)$$

where $$y(l) = \begin{cases} 1 & x(l) > \delta \\ 0 & x(l) \leq \delta \end{cases}, \; x(l) = \sum_{k} \mathrm{lost}(k),$$

and 0<l≤L, 0<k≤K.

Herein L is a source block length that is set when FEC is used for packet loss recovery; for any l greater than 0 and less than or equal to L, K is a quantity of corresponding monitoring windows, the monitoring windows include first $\lfloor N/L \rfloor$ windows obtained by dividing the N source packets based on the preset window length by using an $l^{th}$ source packet in the monitoring period as a start point, and the N source packets are all source packets that are included from the $l^{th}$ source packet in the monitoring period to a last source packet in the monitoring period; and lost(k) is a quantity of source packets that cannot be recovered in a $k^{th}$ window in the K monitoring windows by using FEC, δ is a maximum quantity of lost packets that can be recovered for E source packets by using RET, and E is a quantity of source packets in one monitoring period, that is, a quantity of source packets expected to be received in one monitoring period. Usually, if lost packets in the $k^{th}$ window cannot be recovered, lost(k) is actually a total quantity of lost packets in the $k^{th}$ window. As long as one of the lost packets in the $k^{th}$ window can be recovered, all the lost packets in the window can be recovered, and lost(k) is 0.

It should be noted that, in some embodiments, x(l) may also be $$\frac{\sum_{k} \mathrm{lost}(k)}{E}.$$

In this case, δ is a ratio of the maximum quantity of lost packets that can be recovered for the E source packets by using RET to the quantity E of source packets expected to be received.

Alternatively, ELF_FR satisfies the following formula (4):

The effective packet loss factor ELF_FR satisfies:

$$\mathrm{ELF\_FR} = \frac{1}{L}\sum_{l} \frac{1}{K}\sum_{k} y_l(k) \quad (4)$$

where $$y_l(k) = \begin{cases} 1 & x'_l(k) > R \\ 0 & x'_l(k) \leq R \end{cases}, \; x'_l(k) = \begin{cases} x_l(k) - E' & x_l(k) \geq E' \\ 0 & x_l(k) < E' \end{cases},$$

and 0<l≤L, 0<k≤K.

It should be noted that, in the formula (4), L is a source block length that is set when FEC is used for packet loss recovery; for any l greater than 0 and less than or equal to L, $$\frac{1}{K}\sum_{k} y_l(k)$$

is an average value obtained after summation of $y_l(1)$ to $y_l(K)$, K is a quantity of monitoring windows, the monitoring windows include first $\lfloor N/L \rfloor$ windows obtained by dividing the N source packets based on the preset window length by using an $i^{th}$ source packet in the monitoring period as a start point, and the N source packets are all source packets that are included from the $l^{th}$ source packet in the monitoring period to a last source packet in the monitoring period; and $x_l(k)$ is a quantity of lost packets in a $k^{th}$ window in the K monitoring windows, E' is a quantity of source packets that can be recovered in the $k^{th}$ window by using FEC, and R is a maximum quantity of lost packets that can be recovered for L source packets by using RET. For example, if L is 100, and assuming that a maximum of five packets in every 100 packets are retransmitted, R is 5.

4. In the scenario in which only RET is set, video quality parameters determined by the device include a packet loss rate RTP_LR, a maximum consecutive packet loss length (RTP_LP), and a third effective packet loss factor. The third effective packet loss factor may be an effective packet loss factor x used to indicate a probability of failing to perform packet loss recovery by using RET, or may be an effective packet loss factor y used to indicate a probability of effectively performing packet loss recovery by using RET, where x=1−y. Both y and x may indicate effectiveness of recovering a lost network packet by using RET. Subsequently a method for calculating the third effective packet loss factor is described only by using an example in which the third effective packet loss factor is an effective packet loss factor ELF_R (effective loss factor for RET) used to indicate a probability of failing to perform packet loss recovery by using RET.

RTP_LP is a maximum value of consecutive packet loss quantities. For example, the consecutive packet loss quantities are specifically as follows: A first consecutive packet loss quantity is 2, a second consecutive packet loss quantity is 2, and a third consecutive packet loss quantity is 4. Therefore, RTP_LP is 4.

The third effective packet loss factor ELF_R (that is, the effective packet loss factor x) satisfies:

$$\text{ELF\_R} = \frac{1}{L}\sum_{l} \frac{1}{K}\sum_{k} x_l(k) \quad (5)$$

where $$x_l(k) = \begin{cases} 1, & Num_l(k) > R \\ 0, & Num_l(k) \leq R \end{cases},$$

and $0 < l \leq L$, $0 < k \leq K$.

It should be noted that, L is a preset window length, and may be considered as a quantity of source packets included in one window. For example, if it is specified in advance that 100 source packets are included in one window, L is set to 100. For any l greater than 0 and less than or equal to L $$\frac{1}{K}\sum_{k} x_l(k)$$

is an average value obtained after summation of $x_l(1)$ to $x_l(K)$, K is a quantity of monitoring windows, the monitoring windows include first $\lfloor N/L \rfloor$ i windows obtained by dividing N source packets based on the preset window length by using an $l^{th}$ source packet in a monitoring period as a start point, the N source packets are all source packets that are included from the $l^{th}$ source packet in the monitoring period to a last source packet in the monitoring period, and $Num_l(k)$ is a quantity of lost packets in a $k^{th}$ window in the K monitoring windows. For example, assuming that N is 100, and that L is 10, $Num_2(5)$ represents a quantity of lost packets obtained in a fifth window when every 10 source packets are divided into one window by using a second source packet in the 100 source packets as a start point.

R is a maximum quantity of lost packets that can be recovered for the L source packets by using FEC. For example, if L is 100, and assuming that a maximum of five packets in every 100 packets are retransmitted, R is 5.

In some embodiments, when l is greater than 1, the monitoring windows in the foregoing four scenarios may further include a first window. The first window is a window constituted by source packets before the $l^{th}$ source packet. To be specific, source packets in the first window are all source packets before the $l^{th}$ source packet in the monitoring period. Optionally, the first window is used as a monitoring window only when a quantity of source packets in the first window is greater than a first threshold. The first threshold may be set to $\lfloor L/2 \rfloor$.

In some embodiments, when N/L is not an integer, the monitoring windows further include a second window. The second window is a last window in the windows obtained through window division by using the $l^{th}$ source packet in the monitoring period as the start point. Optionally, the second window is used as a monitoring window only when a quantity of source packets in the second window is greater than a second threshold. The second threshold and the first threshold may be a same value, for example, may be set to $\lfloor L/2 \rfloor$.

For example, source packets whose sequence numbers are 1 to 8 fall within one monitoring period, and a window length (which may be the source block length or the preset window length) is 3. Window division is performed by using a second source packet as a start point, that is, using a source packet whose sequence number is 2 as the start point, and windows obtained through division are [source packet whose sequence number is 2, source packet whose sequence number is 3, source packet whose sequence number is 4], [source packet whose sequence number is 5, source packet whose sequence number is 6, source packet whose sequence number is 7], and [source packet whose sequence number is 8]. Seven source packets are included in total from the second source packet to a last source packet in the monitoring period, and therefore N is 7. If the monitoring windows are first $\lfloor 7/3 \rfloor = 2$ windows, the monitoring windows are [source packet whose sequence number is 2, source packet whose sequence number is 3, source packet whose sequence number is 4], and [source packet whose sequence number is 5, source packet whose sequence number is 6, source packet whose sequence number is 7].

Further, the first window is a window constituted by a source packet before the second source packet, the source packet in the first window is a source packet whose sequence number is 1, and the first window may also be used as a monitoring window. Certainly, if the first threshold is 2, and whether to use the first window as a monitoring window is determined based on the first threshold, the first window cannot be used as a monitoring window because a quantity of source packets in the first window is 1.

In addition, the second window is a last window in the windows obtained through window division by using the second source packet in the monitoring period as the start point, a source packet in the second window is the source packet whose sequence number is 8, and the second window may be used as a monitoring window. Certainly, if the second threshold is 2, and whether to use the second window as a monitoring window is determined based on the second threshold, the second window cannot be used as a monitoring window because a quantity of source packets in the second window is 1.

It should be noted that, when l is different, corresponding K may be different. For example, the monitoring windows include only first $\lfloor N/L \rfloor$ windows after the $i^{th}$ source packet. It is assumed that the whose sequence numbers are 1 to 7 fall within one monitoring period, and that the window length is 3. When l is 1, the monitoring windows include [source packet whose sequence number is 1, source packet whose sequence number is 2, source packet whose sequence number is 3], and [source packet whose sequence number is 4, source packet whose sequence number is 5, source packet whose sequence number is 6], and K is 2. When l is 3, the monitoring windows include [source packet whose sequence number is 3, source packet whose sequence number is 4, source packet whose sequence number is 5], and K is 1.

It should also be noted that, in a specific implementation, division of monitoring periods or windows is performed based on sequence numbers of source packets, that is, lost network packets are also divided into a monitoring period or a window. For example, source packets in a monitoring period are 10 source packets whose sequence numbers are 11 to 20, the source block length is 3, and a source packet whose sequence number is 18 is lost in a transmission process. Assuming that window division is performed by using a second source packet in the 10 source packets as a start point, obtained windows are [source packet whose sequence number is 12, source packet whose sequence number is 13, source packet whose sequence number is 14], [source packet whose sequence number is 15, source packet whose sequence number is 16, source packet whose sequence number is 17], and [source packet whose sequence number is 18, source packet whose sequence number is 19, source packet whose sequence number is 20].

Figure 8:
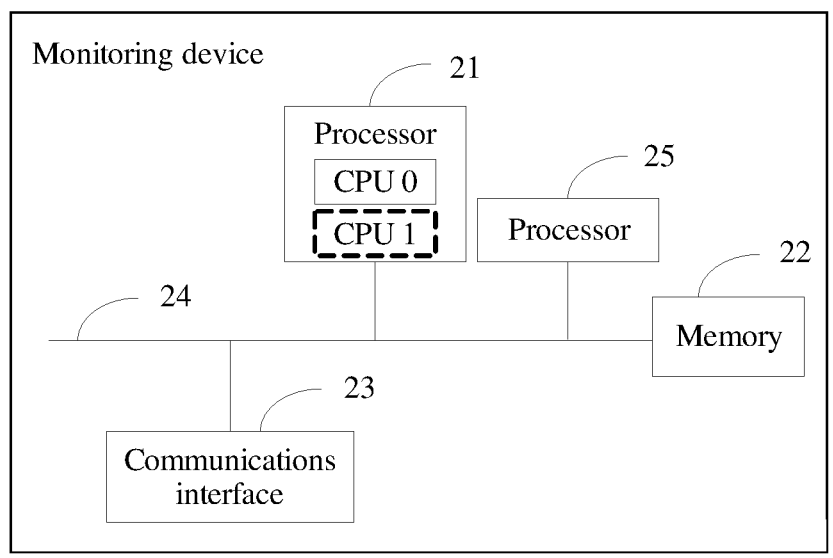
FIG. 8 is a schematic structural diagram of a monitoring device according to an embodiment of the present disclosure.

FIG. 8 is a schematic structural diagram of a monitoring device according to an embodiment of the present disclosure. The monitoring device may be the monitoring device in the video quality monitoring system shown in FIG. 4. As shown in FIG. 8, the monitoring device may include at least one processor 21, a memory 22, and a communications interface 23.

The following describes each component of the monitoring device in detail with reference to FIG. 8.

The processor 21 is a control center of the monitoring device, and may be one processor, or may be a collective term for a plurality of processing elements. For example, the processor 21 is a CPU, an ASIC, or one or more integrated circuits configured to implement this embodiment of the present disclosure, for example, one or more DSPs or FPGAs.

The processor 21 may perform various functions of the monitoring device by running or executing a software program stored in the memory 22 and invoking data stored in the memory 22.

In a specific implementation, in an embodiment, the processor 21 may include one or more CPUs, for example, a CPU 0 and a CPU 1 in FIG. 8.

In a specific implementation, in an embodiment, the monitoring device may include a plurality of processors, for example, the processor 21 and a processor 25 in FIG. 4. Each of the processors may be a single-core (single-CPU) processor, or may be a multi-core (multi-CPU) processor. The processor herein may be one or more devices, circuits, and/or processing cores used for processing data (for example, a computer program instruction).

The memory 22 may be a ROM or another type of static storage device capable of storing static information and instructions, or a RAM or another type of dynamic storage device capable of storing information and instructions, or may be an EEPROM, a CD-ROM, or other compact disc storage or optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or data structures and capable of being accessed by a computer. This is not limited. The memory 22 may exist independently, and is connected to the processor 21 by using a communications bus 24. The memory 22 may also be integrated with the processor 21.

The memory 22 is configured to store a software program for executing the solution of the present disclosure, where the software program is executed under control of the processor 21.

The communications interface 23 may include two communications interfaces: a sending interface for sending data to an external device (for example, a network device that a monitored video stream flows through, such as the BARS or the ONT shown in FIG. 4) and a receiving interface for receiving data from an external device. To be specific, the monitoring device may receive data and send data separately by using two different communications interfaces. Certainly, the communications interface 23 may further integrate a data receiving function and a data sending function into one communications interface, and the communications interface has the data receiving function and the data sending function.

A structure shown in FIG. 8 does not constitute a limitation to the monitoring device. A quantity of components included may be greater or less than that shown in the figure, or some components are combined, or component arrangements are different.

In some embodiments, the processor 21 invokes code in the memory 22 to monitor video quality of the monitored video stream, and further perform fault detection. Specifically, the communications interface 23 sends a video quality parameter request message to at least one network device that the monitored video stream flows through, where the request includes information of the monitored video stream. A scenario in a specific implementation may be the scenario shown in FIG. 5, collection modules are deployed on the ONT and the SIG, and the at least one network device may be the ONT or the SIG. It may be considered that the ONT is a network device nearest to the user terminal, and that the SIG is a network device nearest to the head end device. Certainly, the scenario may also be the scenario shown in FIG. 6, and the at least one network device includes the BARS, the ONT, the OLT, the CR, or the SIG.

The processor 21 obtains, by using the communications interface 23, a video quality parameter that is of the monitored video stream and is monitored by the at least one network device that the monitored video stream flows through. The video quality parameter is determined, according to a packet loss recovery method of the monitored video stream, by the network device that the monitored video stream flows through. For details, refer to the video quality parameters in the four scenarios: the scenario in which no packet loss recovery method is set, the scenario in which only FEC is set, the scenario in which only RET is set and enabled, and the scenario in which both FEC and RET are set.

If the processor 201 of the monitoring device obtains video quality parameters that are of the monitored video stream and are monitored by a first device and a second device, assuming that the first device is the SIG and the second device is the ONT, as in the deployment scenario shown in FIG. 5, after the communications interface 23 sends a video quality parameter request message to the ONT and the SIG, and the ONT determines that at least one of video quality parameters monitored by the ONT exceeds a corresponding threshold, the ONT reports the video quality parameter to the monitoring device. To be specific, if one of a plurality of video quality parameters exceeds a corresponding threshold, the video quality parameter may be reported, or the plurality of video quality parameters may be reported together.

For example, if the packet loss recovery method set for the monitored video stream is FEC, video quality parameters determined by the ONT include a packet loss rate RTP_LR and a first effective packet loss factor ELF_F; and if the packet loss rate RTP_LR exceeds a threshold corresponding to the packet loss rate, the ONT reports RTP_LR to the monitoring device, or may report ELF_F. It should be noted that, the threshold corresponding to the packet loss rate in the scenario in which no packet loss recovery method is set is different from that in the scenario in which a packet loss recovery method is set. For example, the threshold corresponding to the packet loss rate in the scenario in which no packet loss recovery method is set is less than the threshold corresponding to the packet loss rate in the scenario in which a packet loss recovery method is set.

Likewise, video quality parameters determined by the SIG include the packet loss rate RTP_LR and the first effective packet loss factor ELF_F. If the packet loss rate RTP_LR exceeds the threshold corresponding to the packet loss rate, the ONT reports RTP_LR to the monitoring device, or may report ELF_F.

If the processor 201 of the monitoring device obtains video quality parameters reported by all devices that the monitored video stream flows through, as in the deployment scenario shown in FIG. 6, after the communications interface 23 sends a video quality parameter request message to each of the devices such as the ONT and the OLT, each device determines video quality parameters monitored by the device and then reports all the monitored video quality parameters to the monitoring device. For example, if the packet loss recovery method set for the monitored video stream device is FEC, and the video quality parameters determined by the ONT include the packet loss rate RTP_LR and the first effective packet loss factor ELF_F, the BARS, the ONT, the OLT, the CR, the SIG, and the like report respectively monitored RTP_LR and ELF_F to the monitoring device.

Further, when a video service fault occurs on the user terminal, for example, erratic display occurs when the display device performs playback, the processor 21 performs fault detection based on a video quality parameter that is of the monitored video stream and is sent by at least one network device that the monitored video stream flows through. Specifically, in the scenario shown in FIG. 5, if the monitoring device receives, in a monitoring period, the video quality parameter reported by the first device, it indicates that a fault occurs between the first device and the head end device. In some embodiments, the first device is the SIG; and when the monitoring device receives the video quality parameter reported by the SIG, the monitoring device determines that a fault occurs on the head end device.

Alternatively, if the processor 21 receives, in a monitoring period by using the communications interface 23, the video quality parameter reported by the second device but does not receive the video quality parameter reported by the first device, it indicates that a fault occurs between the first device and the second device. In some embodiments, the first device is the SIG and the second device is the ONT; and when the monitoring device does not receive, in a monitoring period, the video quality parameter reported by the SIG but receives the video quality parameter reported by the ONT, the monitoring device determines that a network fault occurs between the SIG and the ONT.

Alternatively, if the processor 21 does not receive, in the monitoring period by using the communications interface 23, the video quality parameter reported by the first device and the video quality parameter reported by the second device, it indicates that no fault occurs upstream of the second device (including the second device), and the video service fault is caused by a fault between the second device and the user terminal. In some embodiments, the first device is the SIG, the second device is the ONT, and the ONT is directly connected to the user terminal (for example, an STB). Therefore, it may be determined that the video service fault is caused by a fault of the user terminal.

In some embodiments, if a probability of receiving, by the processor 21 in at least two consecutive monitoring periods, a first video quality parameter reported by the first device is greater than or equal to a third threshold, the processor 21 determines that a fault occurs between the first device and the head end device. For example, the third threshold is 70%; assuming that the processor 21 receives, in three of four consecutive monitoring periods, the first video quality parameter reported by the first device, that is, a probability of receiving the first video quality parameter is 75%, which is greater than 70%, the processor 21 determines that a fault occurs between the first device and the head end device.

Likewise, if a probability of receiving, by the processor 21 in the at least two consecutive monitoring periods, a second video quality parameter reported by the second device is greater than or equal to a fourth threshold, and a probability of receiving the first video quality parameter in the at least two consecutive monitoring periods is less than the third threshold, the processor 21 determines that a network fault occurs between the first device and the second device.

Alternatively, if a probability of receiving the second video quality parameter by the processor 21 in the at least two consecutive monitoring periods is less than the fourth threshold, the processor 21 determines that a network fault occurs between the second device and the user terminal.

In the scenario shown in FIG. 6, the processor 21 receives the video quality parameter reported by each device that the monitored video stream flows through, and performs fault detection based on the video quality parameter reported by each device. Specifically, the processor determines, based on the video quality parameters reported by the ONT and the SIG, whether a fault occurs on the user terminal, or occurs on the head end device, or occurs in a network transmitting the video stream. Once it is determined that the fault occurs in the network, fault detection may be performed on a specific network segment based on video quality parameters reported by every two neighboring devices. For example, the processor 21 determines a fault probability of each network segment, and determines a network segment with a highest fault probability as a network segment that causes the video service fault.

It should be noted that, the network segment is a network segment between two devices that the monitored video stream flows through, and is determined based on ports on which probes are deployed in the two devices in a specific implementation. For example, if the probes of the two devices are both deployed on outbound interfaces, a network segment between the two devices is a network segment between the outbound interfaces of the two devices.

Figure 9:
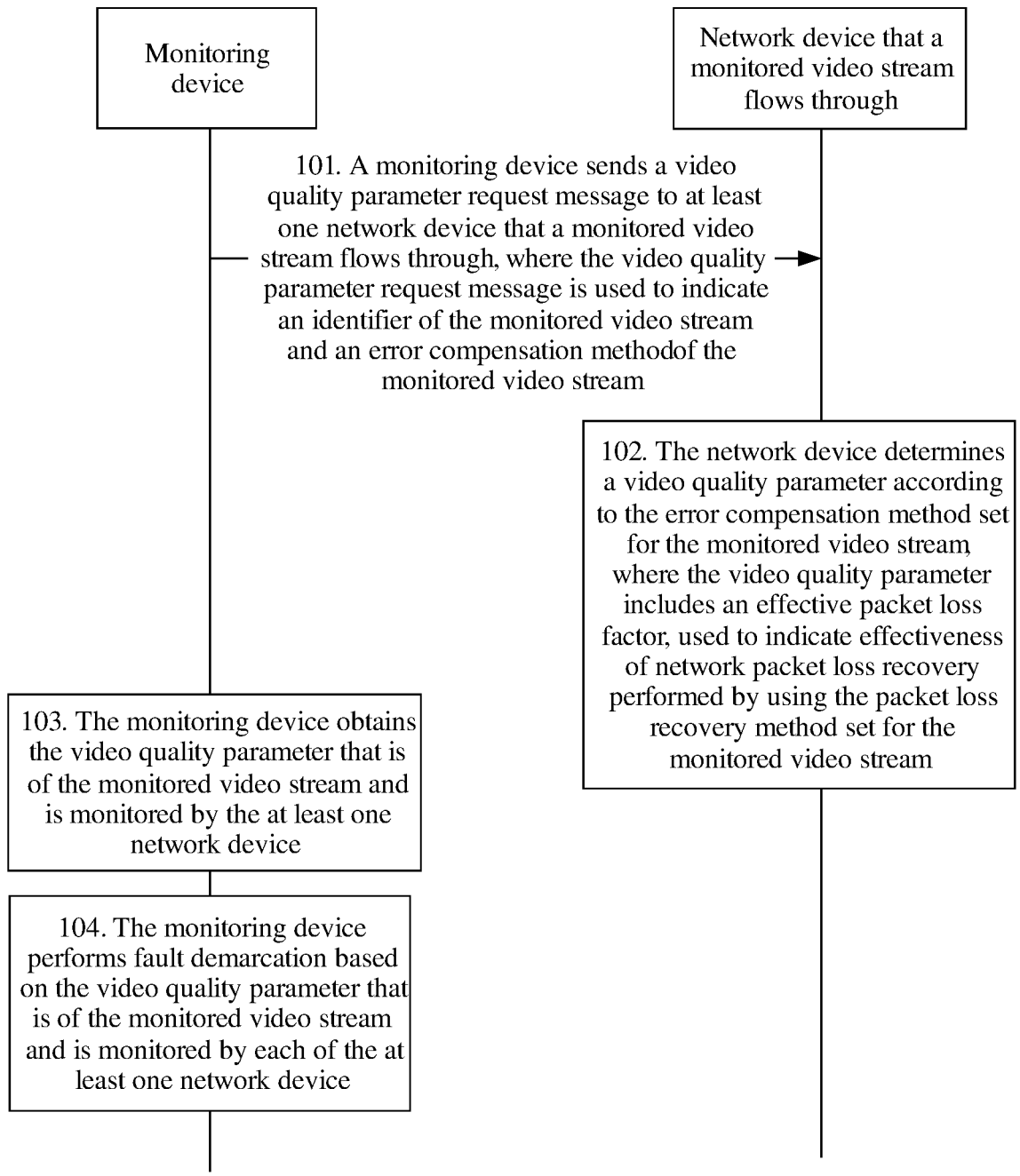
FIG. 9 is a flowchart of a fault detection method according to an embodiment of the present disclosure.

FIG. 9 is a flowchart of a fault detection method according to an embodiment of the present disclosure. As shown in FIG. 9, the method may include the following steps.

101. A monitoring device sends a video quality parameter request message to at least one network device that a monitored video stream flows through, where the video quality parameter request message is used to indicate an identifier of the monitored video stream and a packet loss recovery method of the monitored video stream.

The at least one network device may include an ONT (that is, a second device described in this embodiment of the present disclosure) nearest to a user terminal and a SIG (that is, a first device described in this embodiment of the present disclosure) nearest to a head end device, or may include devices that the monitored video stream flows through, for example, a BARS, an ONT, an OLT, a CR, and a SIG. The packet loss recovery method of the monitored video stream may be considered as a packet loss recovery method set for the monitored video stream. When a network packet loss occurs in a process of transmitting the monitored video stream, the packet loss recovery method of the monitored video stream may be used to recover a lost network packet.

In some embodiments, if the monitored video stream is a live video stream, the identifier of the monitored video stream may be a channel number or a multicast address and a port; or if the monitored video stream is an on-demand video stream, the identifier of the monitored video stream may be a quintuple, for example, a source Internet Protocol (IP) address, a source port, a destination IP address, a destination port, and a transport-layer protocol.

In a specific implementation, the monitored video stream may be a video stream corresponding to a specific channel or a video stream corresponding to a user terminal. If the monitored video stream may be a video stream corresponding to a specific channel, information of the monitored video stream includes channel information, whether a FEC function is enabled on the channel, a size of a FEC coding matrix, a quantity of redundant packets of a single source block, and whether a user terminal (such as an STB) supports a FEC function. If the monitored video stream is for a user terminal, information of the monitored video stream includes whether the terminal has a RET function, information such as a RET retransmission limit (that is, δ), a decoding parameter (a cache capacity) related to the terminal, and the like.

102. Each of the at least one network device determines a video quality parameter according to the packet loss recovery method of the monitored video stream. The video quality parameter includes an effective packet loss factor, used to indicate effectiveness of network packet loss recovery performed by using the packet loss recovery method of the monitored video stream.

First, each network device determines, based on the received video quality parameter request message, the identifier of the monitored video stream and the packet loss recovery method of the monitored video stream, and further determines, based on the packet loss recovery method of the monitored video stream, a video quality parameter that needs to be collected. Specifically, if the packet loss recovery method of the monitored video stream is FEC, the video quality parameter is at least one of a packet loss rate and a first effective packet loss factor (the effective packet loss factor in step 102) determined by the network device that the monitored video stream flows through.

If the packet loss recovery method of the monitored video stream is RET, the video quality parameter is at least one of the packet loss rate and the maximum consecutive packet loss quantity determined by the network device that the monitored video stream flows through.

If both RET and FEC are set for the monitored video stream, the video quality parameter is at least one of a packet loss rate, a maximum consecutive packet loss quantity, and a second effective packet loss factor (the effective packet loss factor in step 102) determined by the network device that the monitored video stream flows through.

It should be noted that, the packet loss rate satisfies the foregoing formula (1), the first effective packet loss factor ELF_F satisfies the foregoing formula (2), the second effective packet loss factor ELF_FR satisfies the foregoing formula (3) or (4), and the third effective packet loss factor ELF_R satisfies the foregoing formula (5). A specific calculation method is not described again herein.

103. The monitoring device obtains the video quality parameter that is of the monitored video stream and is monitored by the at least one network device that the monitored video stream flows through.

In some embodiments, the at least one network device may be the second device nearest to user equipment among network devices that the monitored video stream flows through, and the first device nearest to the head end device among the network devices that the monitored video stream flows through, as in the deployment scenario shown in FIG.

5. In a monitoring period, after determining that a first video quality parameter monitored by the first device exceeds a first threshold, the first device reports the first video quality parameter to the monitoring device. Specifically, if one of a plurality of video quality parameters included in first video quality parameters exceeds a corresponding threshold, the video quality parameter may be reported, or the plurality of video quality parameters included in the first video quality parameters may be reported together.

For example, if the packet loss recovery method set for the monitored video stream device is FEC, the video quality parameters determined by the first device include a packet loss rate RTP_LR and a first effective packet loss factor ELF_F; and if the packet loss rate RTP_LR exceeds a threshold corresponding to the packet loss rate, the ONT reports RTP_LR to the monitoring device, or may report ELF_F. It should be noted that, the threshold corresponding to the packet loss rate in a scenario in which no packet loss recovery method is set is different from that in a scenario in which a packet loss recovery method is set. In some embodiments, the threshold corresponding to the packet loss rate in the scenario in which no packet loss recovery method is set is less than the threshold corresponding to the packet loss rate in the scenario in which a packet loss recovery method is set.

Likewise, video quality parameters determined by the second device include the packet loss rate RTP_LR and the first effective packet loss factor ELF_F. If the packet loss rate RTP_LR exceeds the threshold corresponding to the packet loss rate, the ONT reports RTP_LR to the monitoring device, or may report ELF_F.

In some embodiments, the at least one network device may be N (N is an integer greater than or equal to 2) devices that the monitored video stream flows through, as in the deployment scenario shown in FIG. 6. The N network devices determine video quality parameters monitored by the N network devices, and report all the monitored video quality parameters to the monitoring device in a monitoring period. For example, if the packet loss recovery method set for the monitored video stream device is FEC, and the video quality parameters determined by the N network devices include the packet loss rate RTP_LR and the first effective packet loss factor ELF_F, the N network devices report respectively monitored RTP_LR and ELF_F to the monitoring device.

104. The monitoring device performs fault detection based on the video quality parameter that is of the monitored video stream and is monitored by the at least one network device.

In a specific implementation, if the monitoring device receives, in the monitoring period, the video quality parameter reported by the first device in the deployment scenario shown in FIG. 5, that is, at least one of the video quality parameters monitored by the first device exceeds a corresponding threshold, the monitoring device determines that a fault occurs on the head end device; or if the monitoring device receives, in the monitoring period, the video quality parameter reported by the second device but does not receive the video quality parameter reported by the first device, the monitoring device may determine that a network fault occurs between the second device and the first device; or if the monitoring device does not receive, in the monitoring period, the video quality parameter reported by the first device and the video quality parameter reported by the second device, the monitoring device determines that a fault occurs on the user terminal.

In the deployment scenario shown in FIG. 6, the monitoring device receives the video quality parameter that is of the monitored video stream and is sent by each of the N network devices.

Likewise, the monitoring device may perform fault detection based on the parameter reported by each device. Specifically, if at least one of the video quality parameters reported by the first device exceeds a corresponding threshold, the monitoring device determines that a fault occurs on the head end device; or if none of the video quality parameters reported by the first device exceeds a corresponding threshold, but at least one of the video quality parameters reported by the second device exceeds a corresponding threshold, the monitoring device may determine that a network fault occurs between the second device and the first device; or if none of the video quality parameters reported by the first device and the video quality parameters reported by the second device exceeds a corresponding threshold, the monitoring device determines that a fault occurs on the user terminal.

In the scenario shown in FIG. 6, further, if the monitoring device determines that a network fault occurs between the first device and the second device, the monitoring device may further locate the fault in a network segment based on video quality reported by each device.

Specifically, in this embodiment of the present disclosure, in a flow direction of the monitored video stream, there are M third devices between the first device and the second device; and a network between any two neighboring devices among the first device, the M third devices, and the second device is referred to as a network segment. The first device, the M third devices, and the second device are a first device, a second device, . . . , an $i^{th}$ device, an $(i+1)^{th}$ device, . . . , an $(M+2)^{th}$ device respectively in sequence from upstream to downstream. A network segment is formed between any two neighboring devices among the M+2 devices. M+1 network segments may be determined between the first device, the M third devices, and the second device. The M+1 network segments are a first network segment, a second network segment, . . . , an $i^{th}$ network segment, an $(i+1)^{th}$ network segment, . . . , an $(M+1)^{th}$ network segment respectively in sequence from upstream to downstream. A network segment between the $i^{th}$ device and the $(i+1)^{th}$ device is the $i^{th}$ network segment. i is an integer greater than or equal to 1 and less than or equal to M+1. First, a fault probability of each network segment is determined, and further, a network segment with a highest fault probability among the M+1 network segments may be determined as a faulty network segment.

In some embodiments, the monitoring device may determine the fault probability of each network segment according to the following steps:

For the $i^{th}$ network segment, calculate, according to a formula (6), a fault probability $p_i^Q$ that a fault caused by a $Q^{th}$ parameter in the video quality parameters occurs in the $i^{th}$ network segment:

$$p_i^Q = \begin{cases} \delta_i^Q / \sum_i \delta_i^Q, & \sum_i \delta_i^Q > \lambda_Q \\ 0, & \sum_i \delta_i^Q \leq \lambda_Q \end{cases} \quad (6)$$

where $\delta_i^Q = \theta_{i+1}^Q - \theta_i^Q$, $\theta_{i+1}^Q$ is a $Q^{th}$ parameter reported by the $(i+1)^{th}$ device, $\theta_i^Q$ is a $Q^{th}$ parameter reported by the $i^{th}$ device, $\lambda_Q$ is a threshold corresponding to the $Q^{th}$ parameter, and the $(i+1)^{th}$ device is an upstream device neighboring to the $i^{th}$ device; substitute all parameters included in the video quality parameters into the formula (6), calculate a corresponding fault probability that a fault caused by each parameter occurs in the $i^{th}$ network segment, and determine a highest fault probability as a fault probability $P_i$ of the $i^{th}$ network segment; and traverse each of the N-1 network segments to determine a fault probability of each network segment, further determine a network segment with a highest fault probability as a fault source, and consider that a video service fault is caused by a fault of the network segment.

In some embodiments, the monitoring device may further calculate an average probability of faults in a network segment in several consecutive periods. Specifically, using the $i^{th}$ network segment as an example, a fault probability $p'_i$ of the $i^{th}$ network segment in T consecutive monitoring periods is calculated, where T is an integer greater than or equal to 2, and $p'_i$ satisfies the following formula (7):

$$p'_i = \sum_t \beta_t p_i(t) \quad (7)$$

where $\beta_t$ is a time weighting coefficient, and satisfies $\beta_t = 2^{-t}$, and $t \in [1, \ldots, T]$.

Further, the monitoring device may update the fault probability of the $i^{th}$ network segment to S, where $$S = p'_i / \sum_i p'_i.$$

Figure 10:
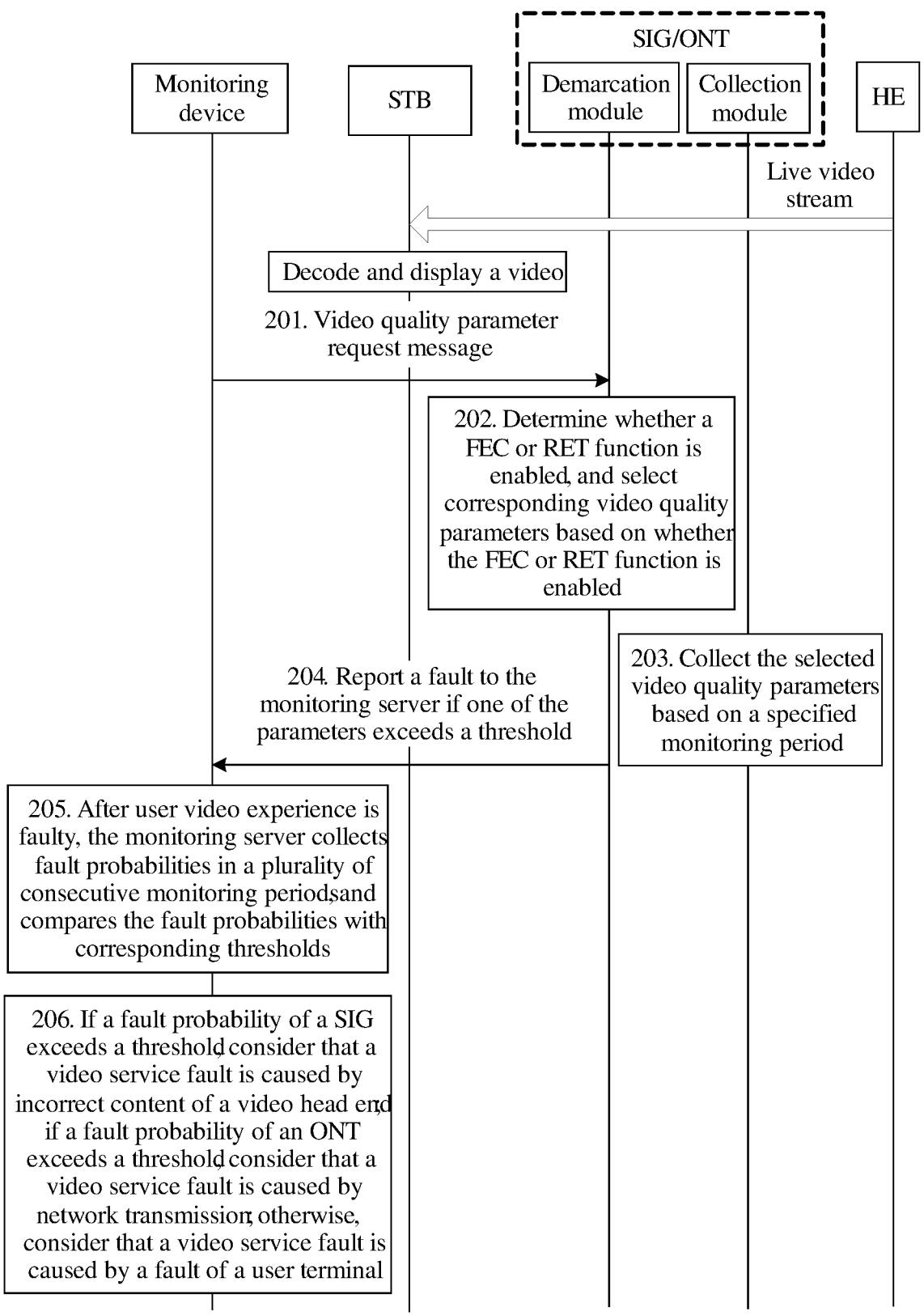
FIG. 10 is another flowchart of a fault detection method according to an embodiment of the present disclosure.

An embodiment of the present disclosure further provides a fault detection method. Referring to the deployment scenario shown in FIG. 5, video fault detection modules and collection modules are deployed on a SIG and an ONT. As shown in FIG. 10, the method may include the following steps.

201. A monitoring device is responsible for sending a video quality parameter request message to a video fault detection module deployed on a SIG or an ONT.

It should be noted that, the request is used to instruct a collection module deployed on the SIG or the ONT to collect a video quality parameter of a monitored video stream (such as a specific channel or user terminal) to monitor video quality of a specific channel or user terminal, and the instruction is used to indicate an identifier of the monitored video stream and a packet loss recovery method of the monitored video stream.

202. The video fault detection module receives the video quality parameter request message, determines, based on the message, whether a FEC or RET function is enabled for a monitored video stream, and selects corresponding video quality parameters based on whether the FEC or RET function is enabled.

Specifically, refer to the video quality parameters in the foregoing four scenarios: the scenario in which no packet loss recovery method is set, the scenario in which only FEC is set, the scenario in which only RET is set and enabled, and the scenario in which both FEC and RET are set. A specific method for calculating each parameter is not described again herein.

203. A collection module collects the selected video quality parameters based on a specified monitoring period.

204. The collection module periodically reports the collected video quality parameters to the video fault detection module, and the video fault detection module compares the collected video quality parameters with corresponding thresholds, and reports a fault to the monitoring device if one of the parameters exceeds a threshold.

Specifically, a parameter that exceeds the threshold may be reported, or all monitored parameters may be reported together to the monitoring device.

205. After user video experience is faulty, the monitoring device collects fault probabilities in a plurality of consecutive monitoring periods, and compares the fault probabilities with corresponding thresholds.

Specifically, collecting fault probabilities in a plurality of consecutive monitoring periods is calculating probabilities of reporting faults by devices in the plurality of consecutive periods. For example, if the SIG reports faults in three of four consecutive periods, a fault probability of the SIG in the four consecutive periods is ¾, that is, 75%.

206. If a fault probability of the SIG exceeds a threshold, consider that a video service fault is caused by incorrect content of a video head end; if a fault probability of the ONT exceeds a threshold, consider that a video service fault is caused by network transmission; otherwise, consider that a video service fault is caused by a fault of a user terminal.

In the method provided by this embodiment of the present disclosure, collection modules are respectively deployed on a most upstream device and a most downstream device that the monitored video stream flows through; and the two devices monitor different video quality parameters according to different packet loss recovery methods (FEC and RET) used by an operator. The parameters are determined according to the used packet loss recovery method. Because compensation of the packet loss recovery method for a packet loss in network transmission is considered, impact of network transmission quality on video service quality is accurately reflected. Further, the monitoring device can accurately determine the impact of network transmission quality on video service quality based on a video quality parameter reported by a device, and therefore accuracy of fault detection on a video service is improved. For example, in the scenario in which only FEC is set for a target monitoring device, although a network status is poor, and a packet loss rate is relatively high, a lost source packet is recovered by using the packet loss recovery method. In this case, the video quality parameters are reported to the monitoring device, that is, at least one of the video quality parameters reported by the ONT exceeds a corresponding threshold, for example, a packet loss rate is higher than a corresponding threshold, but a first packet loss factor reported by the ONT is less than a corresponding threshold, that is, FEC is used to compensate for adverse impact of the network packet loss on the video service. Therefore, the monitoring device may consider that the video service fault is not caused by network transmission.

Figure 11A:
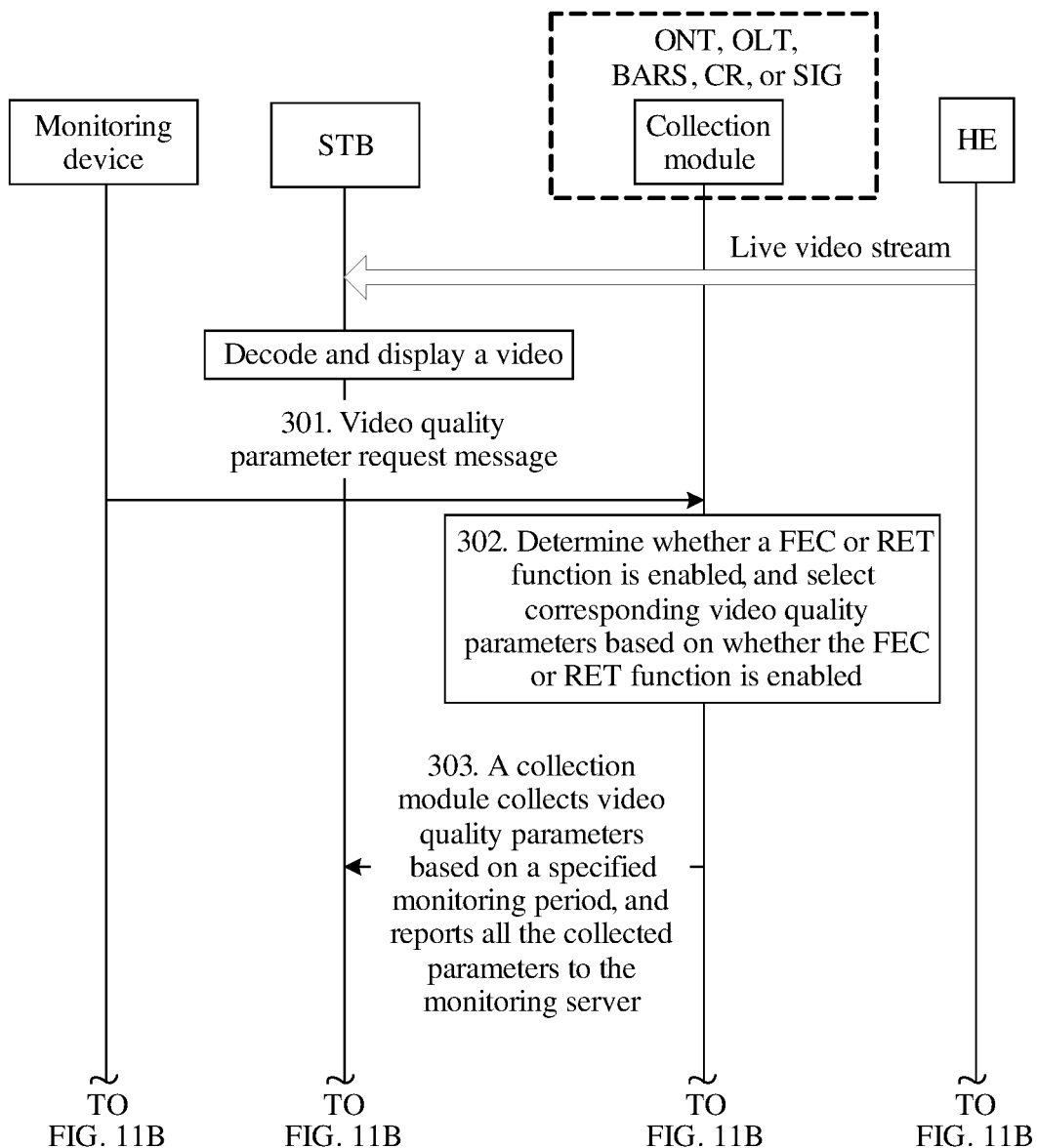
FIG. 11A and FIG. 11B are another flowchart of a fault detection method according to an embodiment of the present disclosure.
Figure 11B:
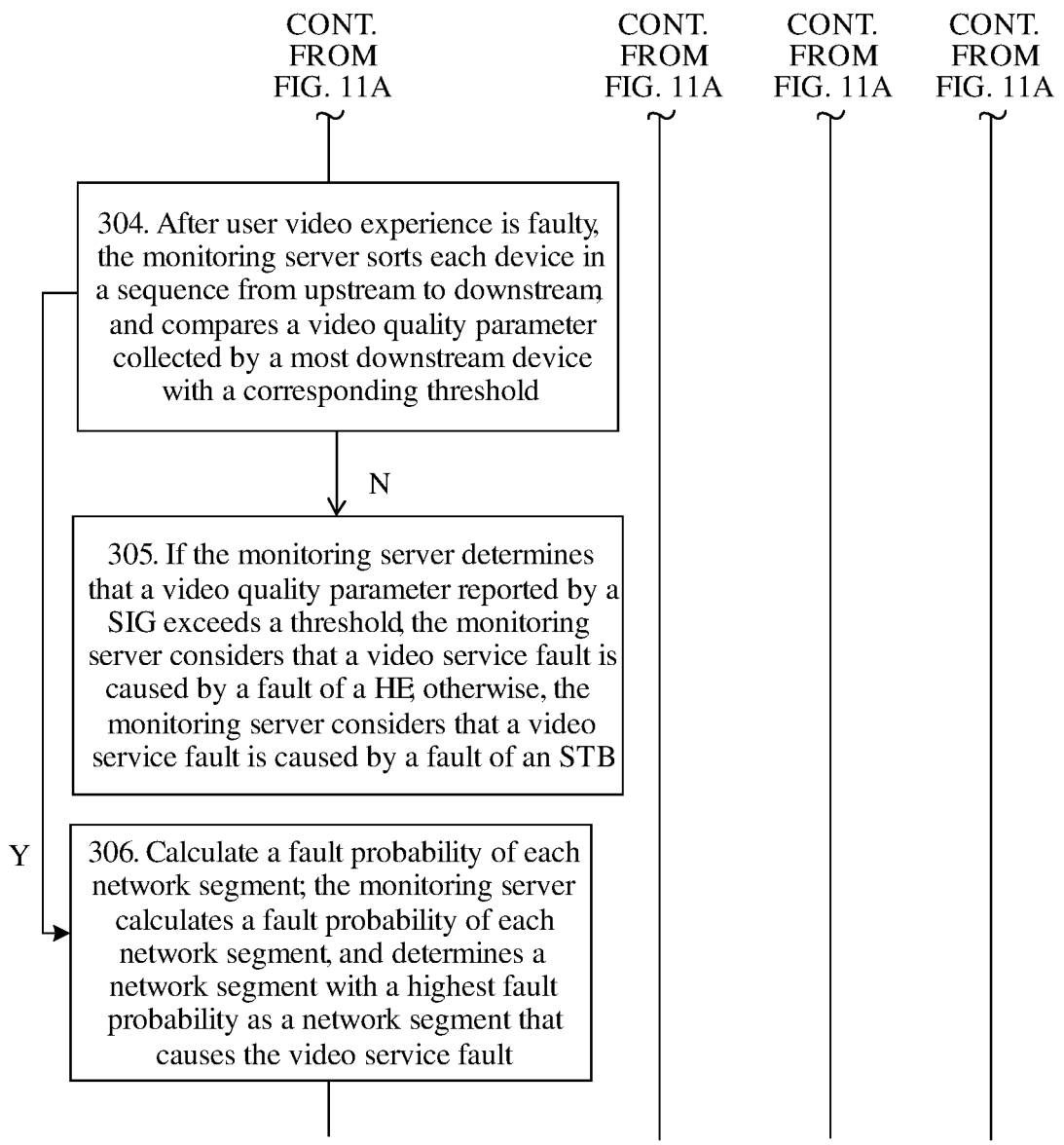

An embodiment of the present disclosure further provides a fault detection method. Referring to the deployment scenario shown in FIG. 6, collection modules are deployed on an ONT, an OLT, a BARS, a CR, and a SIG, and a video fault detection module is deployed on a monitoring device. As shown in FIG. 11A and FIG. 11B, the method may include the following steps.

301. A monitoring device is responsible for sending a video quality parameter request message to a video fault detection module deployed on each network device deployed with a collection module.

It should be noted that, the monitoring device sends the video quality parameter request message to each of an ONT, an OLT, a BARS, a CR, and a SIG. The request is used to instruct a collection module deployed on the SIG or the ONT to collect a video quality parameter of a monitored video stream (such as a specific channel or user terminal) to monitor video quality of a specific channel or user terminal, and the instruction is used to indicate an identifier of the monitored video stream and a packet loss recovery method of the monitored video stream.

302. The video fault detection module receives the video quality parameter request message, determines, based on the message, whether a FEC or RET function is enabled for a monitored video stream, and selects corresponding video quality parameters based on whether the FEC or RET function is enabled.

Specifically, refer to the video quality parameters in the foregoing four scenarios: the scenario in which no packet loss recovery method is set, the scenario in which only FEC is set, the scenario in which only RET is set and enabled, and the scenario in which both FEC and RET are set. A specific method for calculating each parameter is not described again herein.

303. The collection module collects video quality parameters based on a specified monitoring period, and reports all the collected parameters to the monitoring device.

304. After user video experience is faulty, the monitoring device sorts each device in a sequence from upstream to downstream, and compares a video quality parameter collected by a most downstream device with a corresponding threshold.

In a specific implementation, the monitoring device uses a service path restoration method to perform upstream-to-downstream sorting on each device.

If the monitoring device determines that the video quality parameter reported by the most downstream device exceeds the threshold (a parameter may exceed a threshold or a plurality of parameters may exceed thresholds), the monitoring device determines that a video service fault is caused by network transmission, and performs a subsequent demarcation step, that is, step 306; otherwise, the monitoring device determines that a video service fault is not caused by network transmission, and performs step 305.

305. If the monitoring device determines that a video quality parameter reported by a SIG exceeds a threshold, the monitoring device considers that a video service fault is caused by a fault of a HE; otherwise, the monitoring device considers that a video service fault is caused by a fault of an STB.

306. The monitoring device calculates a fault probability of each network segment, and determines a network segment with a highest fault probability as a network segment that causes the video service fault.

Referring to FIG. 6, network devices that the monitored video stream flows through are five devices: the ONT, the OLT, the BARS, the CR, and the SIG, and four network segments in total are determined. A method for calculating a fault probability according to this embodiment of the present disclosure is described by using a first network segment (that is, a network segment between the CR and the SIG) as an example.

Assuming that the packet loss recovery method of the monitored video stream is only FEC, in this scenario, video quality parameters determined by the CR and the SIG include a packet loss rate RTP_LR and a first effective packet loss factor ELF_F.

For a first video quality parameter, that is, the packet loss rate, $\theta_1^1$ is a packet loss rate reported by the SIG, $\theta_2^1$ is a packet loss rate reported by the CR, $\theta_3^1$ is a packet loss rate reported by the BARS, $\theta_4^1$ is a packet loss rate reported by the OLT, and $\theta_5^1$ is a packet loss rate reported by the ONT. Indicator differences are calculated based on packet loss rates reported by two neighboring devices, and four indicator differences are obtained: $\delta_1^2=\theta_2^2-\theta_1^2$, $\delta_2^2=\theta_3^2-\theta_2^2$, $\delta_3^2=\theta_4^2-\theta_3^2$, and $\delta_4^2=\theta_5^2-\theta_4^2$.

A sum W of the indicator differences is calculated, that is, $W=\delta_1^1+\delta_2^1+\delta_3^1+\delta_4^1$. Further, a probability $P_1$ that a fault caused by the packet loss rate parameter occurs in the first network segment is calculated. Specifically, if W is less than or equal to a threshold $\lambda^1$ of the packet loss rate in the scenario (that is, the packet loss recovery method is only FEC), $P_1=0$; or if W is greater than) $\lambda^1$, $P_1=\delta_1^1/W$.

For a second video quality parameter, that is, the first effective packet loss factor, $\theta_1^2$ is a first effective packet loss factor reported by the SIG, $\theta_2^2$ is a first effective packet loss factor reported by the CR, $\theta_3^2$ is a first effective packet loss factor reported by the BARS, $\theta_4^2$ is a first effective packet loss factor reported by the OLT, and $\theta_5^2$ is a first effective packet loss factor reported by the ONT. Indicator differences are calculated based on first effective packet loss factors reported by two neighboring devices, and four indicator differences are obtained: $\delta_1^2=\theta_2^2-\theta_1^2$, $\delta_2^2=\theta_3^2-\theta_2^2$, $\delta_3^2=\theta_4^2-\theta_3^2$, and $\delta_4^2=\theta_5^2-\theta_4^2$.

A sum X of the indicator differences is calculated, that is, $X=\delta_1^2+\delta_2^2+\delta_3^2+\delta_4^2$. Further, a probability $P_2$ that a fault caused by the first effective packet loss factor parameter occurs in the first network segment is calculated. Specifically, if X is less than or equal to a threshold $\lambda^2$ of the first effective packet loss factor in the scenario (that is, the packet loss recovery method is only FEC), $P_2=0$; or if X is greater than $\lambda^2$, $P_2=\delta_1^2/W$.

A larger one of $P_1$ and $P_2$ is used as a fault probability of the first network segment.

Similarly, a fault probability of a second network segment, a fault probability of a third network segment, and a fault probability of a fourth network segment are calculated, and a network segment with a highest fault probability is determined as a network segment that causes the video service fault.

Optionally, the monitoring device may further calculate a probability of each network segment causing the video service fault in a plurality of consecutive monitoring periods, and updates the fault probability of the network segment to a probability of the network segment causing the video service fault in the plurality of consecutive monitoring periods.

In a specific implementation, a probability of a network segment causing the video service fault in a plurality of monitoring periods is calculated according to the following formula:

$$p'_i = \sum_t \beta_t p_i(t),$$

where $\beta_t$ is a time weighting coefficient, a weighting coefficient corresponding to a monitoring period farther away from a fault time point is smaller, $\beta_t=2^{-t}$ $t\in[1, \ldots, T]$, and T is T consecutive monitoring periods.

A fault probability of an $i^{th}$ network segment is updated to S, where $$S = p'_i \Big/ \sum_i p'_i.$$

For example, using the first network segment as an example, in three consecutive monitoring periods, a fault probability in a first monitoring period is $P_1$, a fault probability in a second monitoring period is $P_2$, and a fault probability in a third monitoring period is $P_3$; in addition, the first monitoring period is nearest to the fault time point, the second monitoring period is nearer to the fault time point, and the third monitoring period is farthest from the fault time point. A sum of fault probabilities of the first network segment in the three monitoring periods is calculated: $p'_i=P_1*½+P_2*¼+P_3*⅛$. Further, the fault probability of the first network segment calculated in step 306 is updated to: $(P_1*½+P_2*¼+P_3*⅛)/(p'_1+p'_2+p'_3+p'_4)$, where $p'_2$, is a fault probability of the second network segment, $p_3$ is a fault probability of the third network segment, and $p_4$ is a fault probability of the second network segment.

In the method provided by this embodiment of the present disclosure, a collection module is deployed on each network device transmitting the video stream; and the devices monitor different video quality parameters according to different packet loss recovery methods (FEC and RET) used by an operator. The parameters are determined according to the used packet loss recovery method. Because compensation of the packet loss recovery method for a packet loss in network transmission is considered, impact of network transmission quality on video service quality is accurately reflected. Further, the monitoring device can accurately determine the impact of network transmission quality on video service quality based on a video quality parameter reported by a device, and therefore accuracy of fault detection on a video service is improved. For example, in the scenario in which only FEC is set for a target monitoring device, at least one of video quality parameters reported by the ONT exceeds a corresponding threshold, for example, a packet loss rate is higher than a corresponding threshold, but a first packet loss factor reported by the ONT is less than a corresponding threshold, that is, FEC is used to compensate for adverse impact of the network packet loss on the video service. Therefore, the monitoring device may consider that the video service fault is not caused by network transmission.

The solutions provided by the embodiments of the present disclosure are described above from a perspective of interaction between network elements. It may be understood that, to implement the foregoing functions, the monitoring device and the device in the embodiments of the present disclosure include corresponding hardware structures and/or software modules for performing the functions. A person skilled in the art should easily be aware that, with reference to algorithms steps in the examples described in the embodiments disclosed in this specification, the present disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, functional modules may be defined for the monitoring device and the device used in the embodiments of the present disclosure according to the foregoing examples of the methods. For example, each functional module may be defined in a correspondence to each function, or two or more functions may be integrated into one processing module. The integrated module may be implemented in a form of hardware, or may be implemented in a form of a software functional module. It should be noted that, module division in the embodiments of the present disclosure is an example, and is merely logical function division. There may be other division in an actual implementation.

Figure 12:
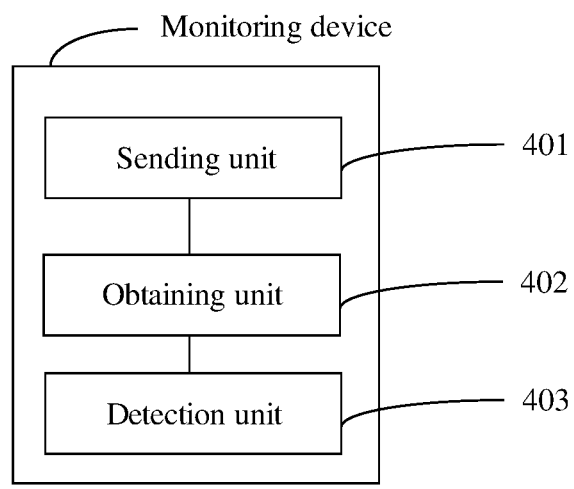
FIG. 12 is another schematic structural diagram of a monitoring device according to an embodiment of the present disclosure.

When each functional module is defined in a correspondence to each function, FIG. 12 is a possible schematic structural diagram of the monitoring device used in the foregoing embodiment. As shown in FIG. 12, the monitoring device may include a sending unit 401, an obtaining unit 402, and a detection unit 403.

The sending unit 401 is configured to support the monitoring device in performing step 101 in the fault detection method shown in FIG. 9, step 201 in the fault detection method shown in FIG. 10, and step 301 in the fault detection method shown in FIG. 11A.

The obtaining unit 402 is configured to support the monitoring device in performing step 103 in the fault detection method shown in FIG. 9 and step 204 in the fault detection method shown in FIG. 10, and further configured to support the monitoring device in performing step 303 in the fault detection method shown in FIG. 11A.

The detection unit 403 is configured to support the monitoring device in performing step 104 in the fault detection method shown in FIG. 9, steps 205 and 206 in the fault detection method shown in FIG. 10, and steps 304 to 306 in the fault detection method shown in FIG. 11B.

Figure 13:
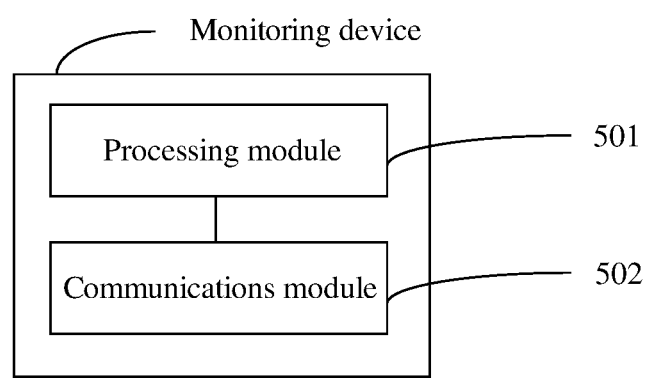
FIG. 13 is another schematic structural diagram of a monitoring device according to an embodiment of the present disclosure.

When an integrated unit is used, FIG. 13 is another possible schematic structural diagram of the monitoring device used in the foregoing embodiment. As shown in FIG. 13, the monitoring device includes a processing module 501 and a communications module 502.

The processing module 501 is configured to control and manage actions of the monitoring device. For example, the processing module 501 is configured to support the monitoring device in performing step 104 in the fault detection method shown in FIG. 9, steps 205 and 206 in the fault detection method shown in FIG. 10, and steps 304 to 306 in the fault detection method shown in FIG. 11B, and/or used in other processes of the technology described in this specification. The communications module 502 is configured to support communication between the monitoring device and another network entity, for example, communication with the SIG or the ONT shown in FIG. 5. The monitoring device may further include a storage module 503 configured to store program code and data of the monitoring device.

The processing module 501 may be a processor or a controller. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 502 may be a transceiver, a transceiver circuit, a communications interface, or the like. The storage module 503 may be a memory.

When the processing module 501 is a processor, and the communications module 502 is a communications interface, and the storage module 503 is a memory, the monitoring device used in this embodiment of the present disclosure may be the monitoring device shown in FIG. 8.

Figure 14:
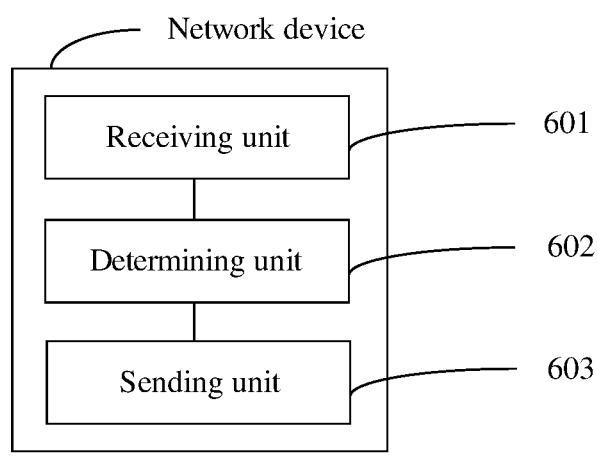
FIG. 14 is another schematic structural diagram of a network device according to an embodiment of the present disclosure.

When each functional module is defined in a correspondence to each function, FIG. 14 is a possible schematic structural diagram of the network device used in the foregoing embodiment. As shown in FIG. 14, the network device may include a receiving unit 601, a determining unit 602, and a sending unit 603.

The receiving unit 601 is configured to support the device in performing step 101 in the fault detection method shown in FIG. 9, step 201 in the fault detection method shown in FIG. 10, and step 301 in the fault detection method shown in FIG. 11A.

The determining unit 602 is configured to support the device in performing step 102 in the fault detection method shown in FIG. 9, steps 202 and 203 in the fault detection method shown in FIG. 10, and step 302 and the step of "collecting video quality parameters based on a specified monitoring period" in step 303 in the fault detection method shown in FIG. 11A.

The sending unit 603 is configured to support the device in performing step 103 in the fault detection method shown in FIG. 9, step 204 in the fault detection method shown in FIG. 10, and the step of "reporting all the collected parameters to the monitoring device" in step 303 in the fault detection method shown in FIG. 11A.

Figure 15:
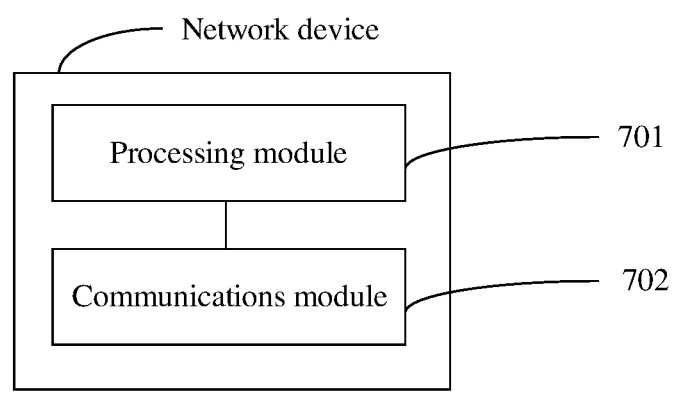
FIG. 15 is another schematic structural diagram of a network device according to an embodiment of the present disclosure.

When an integrated unit is used, FIG. 15 is another possible schematic structural diagram of the network device used in the foregoing embodiment. As shown in FIG. 15, the network device includes a processing module 701 and a communications module 702.

The processing module 701 is configured to control and manage actions of the device. For example, the processing module 701 is configured to support the device in performing step 102 in the fault detection method shown in FIG. 9, steps 202 and 203 in the fault detection method shown in FIG. 10, and step 302 and the step of "collecting video quality parameters based on a specified monitoring period" in step 303 in the fault detection method shown in FIG. 11A, and/or used in other processes of the technology described in this specification. The communications module 702 is configured to support communication between the device and another network entity, for example, communication with the SIG or the ONT shown in FIG. 5. The network device may further include a storage module 703 configured to store program code and data of the device.

The processing module 701 may be a processor or a controller. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 702 may be a transceiver, a transceiver circuit, a communications interface, or the like. The storage module 703 may be a memory.

When the processing module 701 is a processor, and the communications module 702 is a communications interface, and the storage module 703 is a memory, the network device used in this embodiment of the present disclosure may be the network device shown in FIG. 7.

Because the network device provided by this embodiment may be configured to perform the foregoing fault detection method, for a technical effect that can be achieved by the network device, refer to the foregoing method embodiment. Details are not described again in this embodiment.

The foregoing descriptions about implementations allow a person skilled in the art to understand that, for the purpose of convenient and brief description, division of the foregoing functional modules is used as an example for illustration. In an actual application, the foregoing functions can be allocated to different modules and implemented according to a requirement, that is, an internal structure of an apparatus is divided into different functional modules to implement all or some of the functions described above. For a detailed working process of the foregoing system, apparatus, and unit, reference may be made to a corresponding process in the foregoing method embodiments, and details are not described again herein.

In the several embodiments provided, it should be understood that the disclosed system, apparatus, and method may be implemented in other manners. For example, the described apparatus embodiment is merely an example. For example, the module or unit division is merely logical function division and may be other division in an actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure may be implemented in the form of a software product. The software product is stored in a storage medium and includes several instructions for instructing a computer device (which may be a personal computer, a server, a network device, or the like) to perform all or some of the steps of the methods described in the embodiments. The foregoing storage medium includes any medium that can store program code, such as a flash memory, a removable hard disk, a read-only memory, a random access memory, a magnetic disk, or an optical disc.

The foregoing descriptions are merely specific implementations, but are not intended to limit the protection scope of this disclosure. Any variation or replacement within the disclosed technical scope shall fall within the protection scope. Therefore, the protection scope of this disclosure shall be subject to the protection scope of the claims.

What is claimed is:

1. A fault detection method comprising:
performing fault detection based on a packet loss recovery method of a monitored video stream by using an effective packet loss factor,
wherein the effective packet loss factor is based on sliding windows and a maximum quantity of lost packets that can be recovered,
wherein the sliding windows are based on a division of packets, and
wherein the effective packet loss factor indicates an effectiveness of network packet loss recovery using the packet loss recovery method.

2. The fault detection method of claim 1, wherein before performing the fault detection, the fault detection method further comprises:
sending a video quality parameter request message to at least one network device that the monitored video stream flows through, wherein the video quality parameter request message indicates an identifier of the monitored video stream and the packet loss recovery method; and
obtaining the effective packet loss factor from the at least one network device.

3. The fault detection method of claim 1, wherein when the packet loss recovery method is forward error correction (FEC), the effective packet loss factor (ELF_F) is further based on a source block length (L), a quantity (K) of monitoring windows, and a quantity ($Num_f(k)$) of lost packets, and wherein the maximum quantity is a maximum quantity (R) of lost packets that can be recovered using the FEC.

4. The fault detection method of claim 1, wherein when the packet loss recovery method is retransmission (RET), the effective packet loss factor (ELF_R) is further based on a preset window length (L), a quantity (K) of monitoring windows, and a quantity ($Num_f(k)$) of lost packets, and wherein the maximum quantity is a maximum quantity (R) of lost packets that can be recovered using the RET.

5. The fault detection method of claim 1, wherein when the packet loss recovery method is forward error correction (FEC) and retransmission (RET), the effective packet loss factor (ELF_FR) is further based on a source block length (L), a quantity (K) of monitoring windows, a quantity (lost(k)) of source packets that cannot be recovered using the FEC, and a quantity (E) of source packets in one monitoring period, wherein the maximum quantity is a maximum quantity ($\delta$) of lost packets that can be recovered using the RET.

6. The fault detection method of claim 1, wherein when the packet loss recovery method is forward error correction (FEC) and retransmission (RET), the effective packet loss factor (ELF_FR) is further based on a source block length (L), a quantity (K) of monitoring windows, a quantity ($x_f(k)$) of lost packets, and a quantity (E') of source packets that can be recovered using the FEC, and wherein the maximum quantity is a maximum quantity (R) of lost packets that can be recovered using the RET.

7. The fault detection method of claim 3, wherein ELF_F is further based on a counter (l) that is between 0 and L, and wherein when l is greater than 1, the monitoring windows comprise a first window constituted by source packets before an $l^{th}$ source packet.

8. The fault detection method of claim 7, wherein when a quantity of source packets in the first window is greater than a first threshold, the monitoring windows comprise the first window.

9. The fault detection method of claim 3, wherein ELF_F is further based on a quantity (N) of source packets, and wherein when N/L is not an integer, the monitoring windows comprise a second window that is a last window in windows obtained through window division using an $l^{th}$ source packet in a monitoring period as a start point.

10. The fault detection method of claim 9, wherein when a quantity of source packets in the second window is greater than a second threshold, the monitoring windows comprise the second window.

11. The fault detection method of claim 2, wherein the at least one network device comprises a first device, and wherein when receiving a first effective packet loss factor reported by the first device in a monitoring period, the fault detection method further comprises determining that a first fault has occurred between the first device and a head end device providing the monitored video stream.

12. The fault detection method of claim 11, wherein the at least one network device further comprises a second device downstream from the first device, and wherein when receiving a second effective packet loss factor reported by the second device and when not receiving the first effective packet loss factor in the monitoring period, the fault detection method further comprises determining that a second fault has occurred between the first device and the second device.

13. The fault detection method of claim 11, wherein the at least one network device further comprises a second device downstream from the first device, and wherein when not receiving a second effective packet loss factor from the second device and when not receiving the first effective packet loss factor from the first device in the monitoring period, the fault detection method further comprises determining that a second fault has occurred between the second device and a user terminal receiving the monitored video stream.

14. The fault detection method of claim 2, wherein the at least one network device comprises N network devices, and wherein the fault detection method further comprises receiving the effective packet loss factor from each of the N network devices.

15. The fault detection method of claim 14, further comprising determining, when at least one of first effective packet loss factor reported by a first device of the N network devices is greater than or equal to a corresponding threshold, that a fault has occurred between a second device and a head end device providing the monitored video stream.

16. The fault detection method of claim 14, further comprising determining, when a first effective packet loss factor reported by a first device of the N network devices is less than a corresponding threshold and when a second effective packet loss factor reported by a second device of the N network devices and downstream of the first device is greater than or equal to a corresponding threshold, that a network fault has occurred between the first device and the second device.

17. The fault detection method of claim 16, wherein when the network fault has occurred between the first device and the second device, the fault detection method further comprises:
determining a fault probability of each of M+1 network segments, wherein each network segment is between any two neighboring devices among the first device, M third devices between the first device and the second device, and the second device, and wherein M is an integer less than N; and
determining a network segment with a highest fault probability among the M+1 network segments as a faulty network segment.

18. A monitoring device comprising:
a memory configured to store instructions; and
a processor coupled to the memory and configured to execute the instructions to cause the monitoring device to:
perform fault detection based on a packet loss recovery method of a monitored video stream by using an effective packet loss factor,
wherein the effective packet loss factor is based on sliding windows and a maximum quantity of lost packets that can be recovered,
wherein the sliding windows are based on a division of packets, and
wherein the effective packet loss factor indicates an effectiveness of network packet loss recovery using the packet loss recovery method.

19. The monitoring device of claim 18, wherein before performing the fault detection, the processor is further configured to execute the instructions to cause the monitoring device to:
send a video quality parameter request message to at least one network device that the monitored video stream flows through, wherein the video quality parameter request message indicates an identifier of the monitored video stream and the packet loss recovery method; and
obtain the effective packet loss factor from the at least one network device.

20. A computer program product comprising instructions that are stored on a non-transitory computer-readable medium and that, when executed by a processor, cause an apparatus to:
perform fault detection based on a packet loss recovery method of a monitored video stream by using an effective packet loss factor,
wherein the effective packet loss factor is based on sliding windows and a maximum quantity of lost packets that can be recovered,
wherein the sliding windows are based on a division of packets, and
wherein the effective packet loss factor indicates an effectiveness of network packet loss recovery using the packet loss recovery method.

* * * * *